(12) United States Patent
Neels et al.

(10) Patent No.: US 9,582,585 B2
(45) Date of Patent: *Feb. 28, 2017

(54) DISCOVERING FIELDS TO FILTER DATA RETURNED IN RESPONSE TO A SEARCH

(71) Applicant: Splunk Inc., San Francisco, CA (US)

(72) Inventors: Alice Emily Neels, Berkeley, CA (US); Sundar Vasan, San Francisco, CA (US); Simon Fishel, San Francisco, CA (US); Marc Vincent Robichaud, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,937

(22) Filed: Jul. 31, 2014

(65) Prior Publication Data

US 2015/0026167 A1 Jan. 22, 2015

Related U.S. Application Data

(63) Continuation-in-part of application No. 14/067,203, filed on Oct. 30, 2013, which is a continuation of (Continued)

(51) Int. Cl.
| | | |
|---|---|---|
| *G06F 3/0482* | (2013.01) | |
| *G06F 3/0484* | (2013.01) | |
| *G06F 17/30* | (2006.01) | |

(52) U.S. Cl.
CPC ...... *G06F 17/30867* (2013.01); *G06F 3/0482* (2013.01); *G06F 3/04842* (2013.01); *G06F 17/3053* (2013.01); *G06F 17/30424* (2013.01)

(58) Field of Classification Search
CPC .......... G06F 17/30867; G06F 17/3053; G06F 3/04842; G06F 3/0482
(Continued)

(56) References Cited

U.S. PATENT DOCUMENTS 5,550,971 A 8/1996 Brunner et al.
5,999,933 A 12/1999 Mehta
(Continued)

OTHER PUBLICATIONS

Carasso, David, "Exploring Splunk Search Processing Language (SPL) Primer and Cookbook", Splunk Inc., 2012 CITO Research, New York, 154 Pages.
(Continued)

*Primary Examiner* — Jorge A Casanova
(74) *Attorney, Agent, or Firm* — Wong & Rees LLP

(57) ABSTRACT

Fields may be discovered in events that are returned in response to an initial search. The events may comprise portions of raw data. Furthermore, the fields may be defined by extraction rules for extracting values from corresponding portions of raw data. The displaying of a graphical user interface (GUI) may be caused where the GUI enables a user to select or enter criteria for a subset of the discovered fields without entering a search query in a search bar. At least one criterion for at least one field from the subset of the discovered fields may be received through a portion of the GUI that does not include a search bar for entering a search query. The events returned in response to the initial search query may be caused to be filtered based on the received criterion.

40 Claims, 21 Drawing Sheets

Related U.S. Application Data application No. 13/607,117, filed on Sep. 7, 2012, now Pat. No. 8,788,525.

(58) Field of Classification Search
USPC .......................................................... 707/723
See application file for complete search history.

(56) References Cited

U.S. PATENT DOCUMENTS

| | | | |
|---|---|---|---|
| 7,562,069 | B1 | 7/2009 | Chowdhury et al. |
| 8,412,696 | B2 | 4/2013 | Zhang et al. |
| 8,442,982 | B2 | 5/2013 | Jacobson et al. |
| 8,516,008 | B1 | 8/2013 | Marquardt et al. |
| 8,548,973 | B1* | 10/2013 | Kritt ............... G06F 17/30867 707/706 |
| 8,589,403 | B2 | 11/2013 | Marquardt et al. |
| 8,682,925 | B1 | 3/2014 | Marquardt et al. |
| 8,700,658 | B2 | 4/2014 | Rambhia et al. |
| 8,713,000 | B1 | 4/2014 | Elman et al. |
| 8,751,486 | B1* | 6/2014 | Neeman et al. .............. 707/722 |
| 8,788,526 | B2 | 7/2014 | Neels et al. |
| 8,910,084 | B2 | 12/2014 | Helfman et al. |
| 8,983,994 | B2 | 3/2015 | Neels et al. |
| 2001/0018689 | A1 | 8/2001 | Spence et al. |
| 2001/0023414 | A1 | 9/2001 | Kumar et al. |
| 2002/0054101 | A1 | 5/2002 | Beatty |
| 2003/0131215 | A1 | 7/2003 | Bellew |
| 2003/0187821 | A1 | 10/2003 | Cotton et al. |
| 2004/0078359 | A1 | 4/2004 | Bolognese et al. |
| 2004/0111410 | A1 | 6/2004 | Burgoon et al. |
| 2004/0186826 | A1* | 9/2004 | Choi et al. ......................... 707/3 |
| 2004/0220965 | A1 | 11/2004 | Harville et al. |
| 2004/0225641 | A1 | 11/2004 | Dettinger et al. |
| 2004/0267770 | A1* | 12/2004 | Lee ............... 707/100 |
| 2005/0015363 | A1* | 1/2005 | Dessloch et al. .................. 707/3 |
| 2005/0192921 | A1 | 9/2005 | Chaudhuri et al. |
| 2005/0203876 | A1 | 9/2005 | Cragun et al. |
| 2006/0041539 | A1 | 2/2006 | Matchett et al. |
| 2006/0053174 | A1* | 3/2006 | Gardner et al. .............. 707/203 |
| 2006/0112123 | A1* | 5/2006 | Clark et al. .................... 707/101 |
| 2006/0123010 | A1* | 6/2006 | Landry et al. .................. 707/10 |
| 2006/0143159 | A1 | 6/2006 | Chowdhury et al. |
| 2006/0253423 | A1 | 11/2006 | McLane et al. |
| 2006/0259474 | A1* | 11/2006 | Granito .............. 707/3 |
| 2006/0293979 | A1 | 12/2006 | Cash et al. |
| 2007/0078872 | A1* | 4/2007 | Cohen ............... G06F 17/30696 |
| 2007/0118491 | A1* | 5/2007 | Baum et al. .................... 706/20 |
| 2007/0209080 | A1 | 9/2007 | Ture et al. |
| 2007/0214164 | A1 | 9/2007 | MacLennan et al. |
| 2007/0259709 | A1 | 11/2007 | Kelly et al. |
| 2008/0104542 | A1 | 5/2008 | Cohen et al. |
| 2008/0222125 | A1 | 9/2008 | Chowdhury |
| 2008/0270366 | A1 | 10/2008 | Frank |
| 2008/0301095 | A1* | 12/2008 | Zhu et al. ......................... 707/3 |
| 2008/0319965 | A1 | 12/2008 | Dettinger et al. |
| 2009/0013281 | A1 | 1/2009 | Helfman et al. |
| 2009/0069739 | A1 | 3/2009 | Mohamed |
| 2009/0125546 | A1 | 5/2009 | Iborra et al. |
| 2009/0300065 | A1 | 12/2009 | Birchall |
| 2009/0319512 | A1 | 12/2009 | Baker et al. |
| 2009/0326924 | A1 | 12/2009 | Crider et al. |
| 2009/0327319 | A1 | 12/2009 | Bertram et al. |
| 2010/0095018 | A1 | 4/2010 | Khemani et al. |
| 2010/0100562 | A1 | 4/2010 | Millsap |
| 2010/0161677 | A1 | 6/2010 | Zurek et al. |
| 2010/0182321 | A1 | 7/2010 | Cartan |
| 2010/0251100 | A1 | 9/2010 | Delacourt |
| 2010/0275024 | A1 | 10/2010 | Abdulhayoglu |
| 2010/0290617 | A1 | 11/2010 | Nath |
| 2010/0299135 | A1 | 11/2010 | Fritsch et al. |
| 2010/0306281 | A1 | 12/2010 | Williamson |
| 2011/0066585 | A1 | 3/2011 | Subrahmanyam et al. |
| 2011/0082884 | A1* | 4/2011 | Hollingsworth .. G06F 17/30864 707/776 |
| 2011/0218978 | A1 | 9/2011 | Hong et al. |
| 2011/0320459 | A1* | 12/2011 | Chisholm .................... 707/748 |
| 2012/0079363 | A1 | 3/2012 | Folting et al. |
| 2012/0117116 | A1 | 5/2012 | Jacobson et al. |
| 2012/0159370 | A1 | 6/2012 | Rode et al. |
| 2012/0185441 | A1 | 7/2012 | Sankar et al. |
| 2012/0283948 | A1 | 11/2012 | Demiryurek et al. |
| 2012/0296876 | A1 | 11/2012 | Bacinschi et al. |
| 2012/0296878 | A1 | 11/2012 | Nakae et al. |
| 2013/0041824 | A1 | 2/2013 | Gupta |
| 2013/0054642 | A1 | 2/2013 | Morin |
| 2013/0060912 | A1 | 3/2013 | Rensin et al. |
| 2013/0073957 | A1 | 3/2013 | DiGiantomoasso et al. |
| 2013/0080190 | A1* | 3/2013 | Mansour et al. .................. 705/3 |
| 2013/0262371 | A1 | 10/2013 | Nolan |
| 2013/0311438 | A1 | 11/2013 | Marquardt et al. |
| 2013/0318236 | A1 | 11/2013 | Coates et al. |
| 2013/0318603 | A1 | 11/2013 | Merza et al. |
| 2013/0326620 | A1 | 12/2013 | Merza et al. |
| 2014/0019448 | A1 | 1/2014 | Leonard et al. |
| 2014/0019909 | A1 | 1/2014 | Leonard et al. |
| 2014/0046976 | A1 | 2/2014 | Zhang et al. |
| 2014/0074887 | A1 | 3/2014 | Neels et al. |
| 2014/0160238 | A1 | 6/2014 | Yim et al. |
| 2014/0236854 | A1 | 8/2014 | Vasan et al. |
| 2014/0236890 | A1 | 8/2014 | Vasan et al. |
| 2014/0324862 | A1 | 10/2014 | Bingham et al. |
| 2015/0019537 | A1 | 1/2015 | Neels et al. |
| 2015/0339344 | A1 | 11/2015 | Neels et al. |
| 2016/0140743 | A1 | 5/2016 | Neels et al. |
| 2016/0217599 | A1 | 7/2016 | Neels et al. |
| 2016/0246495 | A1 | 8/2016 | Neels et al. |
| 2016/0321369 | A1 | 11/2016 | Neels et al. |

OTHER PUBLICATIONS

Bitincka, Ledion, et al., "Optimizing Data Analysis with a Semi-Structured Time Series Database", Splunk Inc., 2010, pp. 1-9.
http://docs.splunk.com/Documentation/PCI/2.1.1/ [000119] User/IncidentReviewdashboard, 2 Pages (Last accessed Aug. 5, 2014).
"vSphere Monitoring and Performance", VMware, Inc., Update 1, vSphere 5.5, EN-001357-02, 2010-2014, pp. 1-174 http://pubs.vmware.com/ vsphere-55/topic/com.vmware.ICbase/PDF/vsphere-esxi-vcenter-server-551-monitoring-performance-guide.pdf.
U.S. Appl. No. 14/167,316, filed Jan. 29, 2014.
U.S. Appl. No. 14/448,995, filed Jul. 31, 2014.
U.S. Appl. No. 15/143,579, Non-Final Office Action dated Oct. 21, 2016.
U.S. Appl. No. 14/815,884, Notice of Allowance dated Oct. 24, 2016.
U.S. Appl. No. 14/503,335, Non-Final Office Action dated Nov. 3, 2016.
U.S. Appl. No. 15/007,182, Final Office Action dated Nov. 17, 2016.
U.S. Appl. No. 15/143,582, Final Office Action dated Nov. 25, 2016.

* cited by examiner

FIG. 5B

```
Original Search: 501
search "error | stats count BY host

Sent to peers: 502
search "error | prestats count BY host (map)
```

DISCOVERING FIELDS TO FILTER DATA RETURNED IN RESPONSE TO A SEARCH

RELATED APPLICATION

This Continuation-in-Part claims priority to pending U.S. patent application Ser. No. 14/067,203 filed Oct. 30, 2013, which is a continuation of U.S. patent application Ser. No. 13/607,117 filed on Sep. 7, 2012, issued on Jul. 22, 2014 as U.S. Pat. No. 8,788,525, all of which are incorporated by reference herein.

TECHNICAL FIELD

The present disclosure is generally related to data aggregation and analysis systems, and is more specifically related to discovering fields to filter data returned in response to a search for data aggregation and analysis systems.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure will be understood more fully from the detailed description given below and from the accompanying drawings of various implementations of the disclosure.

FIG. 5B illustrates an example graphical user interface displaying fields discovered from the events that were returned in response to an initial search query in accordance with some embodiments.

FIG. 12 illustrates an exemplary search query received from a client and executed by search peers in accordance with the disclosed embodiments.

FIG. 13B illustrates a data summary dialog that enables a user to select various data sources in accordance with the disclosed embodiments.

DETAILED DESCRIPTION

Figure 1:
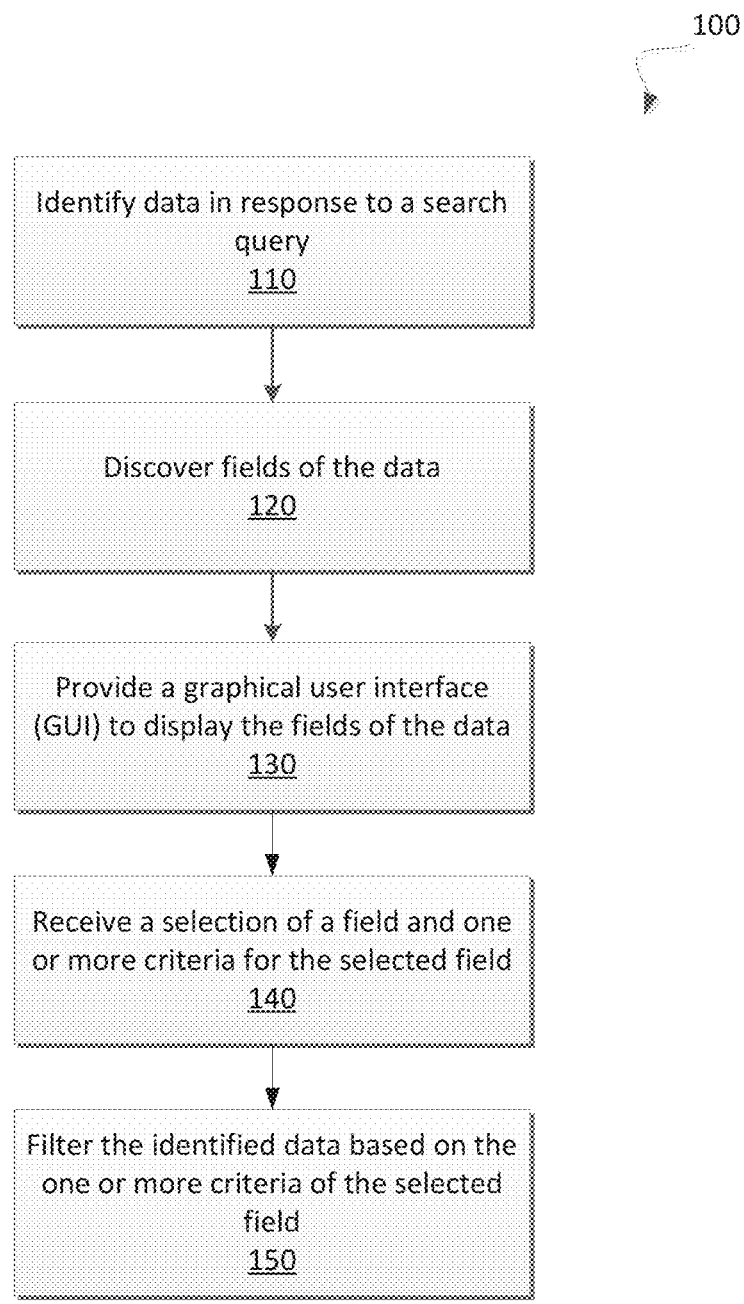
FIG. 1 illustrates an example method to discover fields based on the results of an initial search of source data to further filter the initial search in accordance with some embodiments.

Aspects of the present disclosure are directed to discovering fields to filter data returned in response to a search. The data may be heterogeneous machine-generated data received from various sources, including servers, databases, applications, networks, etc. The source data can include multiple events. An event can be represented by a data structure that is associated with a certain point in time and comprises a portion of raw machine data (i.e., machine-generated data). Accordingly, the source data may include events that correspond to a portion of the source data. Fields may be discovered from the events. For example, an event can include, at least in part, values representing different fields. A field may refer to a location in the event that stores a respective value. Accordingly, each event is associated with fields and includes values for the fields.

A search may be performed on the source data. Depending on a search query, different types of data may be returned in response to the search query, including but not limited to returning multiple events. For example, a search query may be received and a subset of the events from the source data that satisfy criteria specified by the search query may be identified. In some embodiments, the criteria of a search query may refer to particular fields and values for the fields that may be present in an event for the event to be identified and returned in response to the search query. The search query may be referred to as an initial search query.

Each of the fields that are included in at least one event that satisfies the initial search query may be discovered. A portion or subset of the fields may be selected to be provided in a graphical user interface (GUI). A user may select one or more criteria for one or more of the fields that are displayed in the GUI and the user may further filter the events returned in response to the initial search query. For example, a user may select one of the fields displayed in the GUI and provide one or more criteria for the field. Subsequently, a filtering operation may be performed on the events returned in response to the initial search query based on one or more criteria of the selected field. A filtering operation may refer to the generating of a filtering search query based on one or more criteria for at least one field and the applying of the filtering search query to events that were returned in response to the initial search query. Alternatively, a filtering operation may refer to the generating of a replacement search query that includes criteria from an initial search query and one or more criteria for at least one field and the applying of the replacement search query to events that were returned in response to the initial search query. In some embodiments, specific events that were included in the events returned in response to the initial search query may be identified by the filtering operation when an event includes a value that satisfies one or more criteria provided by the user through the GUI for the selected field.

Accordingly, the discovering of the fields from a search of data may facilitate a user to further filter data returned in response to a search. The automatic discovery of the fields and the displaying of the fields in a GUI may assist a user who is not familiar with the source data that he or she is analyzing or searching. For example, the user may provide an initial search query and may use the fields that are discovered in the returned data to specify one or more criteria for a subset of the fields that may be more relevant or interesting to the user for analyzing or searching the data. Accordingly, the GUI may provide an easy to use interface for a user (e.g., a user who may not be familiar with a search query language) with automatically discovered fields in the data returned in response to an initial search so that the user may further filter the returned data based on one or more of the automatically discovered fields. The GUI may provide a drop-down menu or a text box for entering or selecting at least one criterion for a discovered field.

FIG. 1 illustrates an example method 100 to discover fields based on the results of an initial search of source data to further filter the initial search. The method 100 may be performed by processing logic that may comprise hardware (e.g., a processing device, circuitry, dedicated logic, programmable logic, microcode, etc.), software (e.g., instructions run on a processing device), or a combination thereof. In some embodiments, the method 100 may be performed by a field module 200 of FIG. 2.

As shown in FIG. 1, the method 100 may begin by the processing logic identifying data returned in response to an initial search query (block 110). For example, the initial search query may be received from a user. The initial search query may include one or more criteria for a particular field of source data. As previously described, the source data may be organized or stored as events where each event includes a portion of the source data and is associated with a particular point in time. In response to the initial search query, the processing logic may identify and return the events that match or satisfy the criteria of the search query. The processing logic may further discover fields that are included in events that were returned in response to the initial search query (block 120). For example, the fields may be discovered based on extraction rules that are applied to events to extract values for specific fields. In some embodiments, an extraction rule for a field may include an instruction that specifies how to extract a value for a field from the portion of an event. Additional details with regard to extraction rules are disclosed in conjunction with FIGS. 8-14D. Accordingly, each field that is included in any of the events that are returned in response to the initial search query may be discovered.

The processing logic may further provide a graphical user interface (GUI) to display the fields of the events returned in response to the initial search query (block 130). In some embodiments, a subset of the fields may be selected to be displayed in the GUI. Additional details with regard to selecting a subset of the fields of the events that are returned in response to the initial search query are disclosed in conjunction with FIGS. 2-7.

Referring to FIG. 1, the processing logic may receive a selection of a field and one or more criteria for the selected field (block 140). For example, one of the fields that is displayed by the GUI may be selected by a user and the user may provide one or more criteria for the selected field. Furthermore, the processing logic may filter the events returned in response to the initial search query based on the value of the selected field (block 150). For example, the events that were returned in response to the initial search query may be further searched to identify a subset of the events that include a value that satisfies the one or more criteria provided by the user for the field that was selected in the GUI.

As an example, source data may include a first set of events. An initial search query may be performed on the source data to identify and return a second set of events where each event of the second set satisfies criteria of the initial search query. The second set of events may be a subset of the first set of events (e.g., the first set of events includes the same or larger number of events than the second set of events or the second set of events includes all or a portion of the first set of events). Fields that are included in any event of the second set may be automatically discovered based on extraction rules, as discussed in more detail below. A graphical user interface (GUI) may be provided to display at least some of the automatically discovered fields. A user may provide (e.g., select or enter) criteria for one or more of the displayed fields through a portion of the GUI that does not include a search bar for entering a search query. Subsequently, a filtering operation may be performed on the second set of events to identify and return a third set of events where each event of the third set satisfies the criteria provided by the user. The third set of events may be a subset of the second set of events. Accordingly, fields of events that are returned in response to an initial search query may be discovered and provided to a user via a graphical user interface to facilitate a subsequent search of the events to further filter the events returned by the initial search that was requested by the user. Further details with regard to discovering fields and providing a graphical user interface are disclosed in conjunction with FIGS. 2-7.

Figure 2:
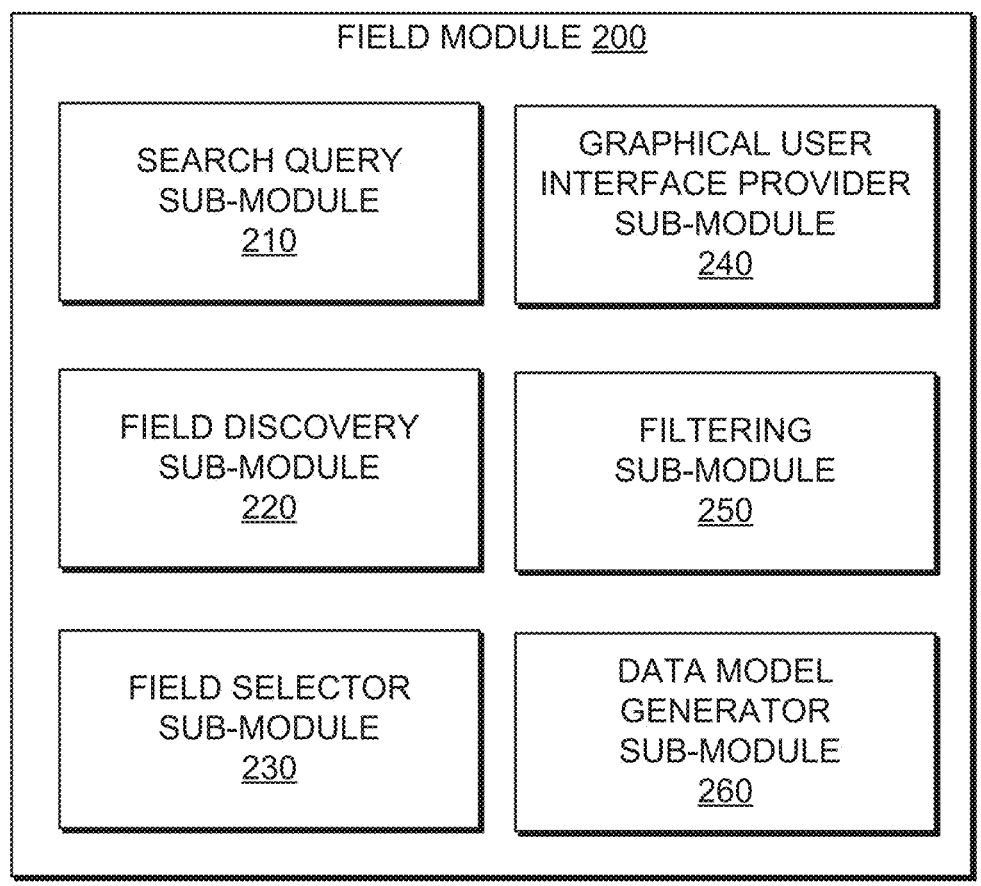
FIG. 2 is a block diagram of an example field module in accordance with some embodiments of the disclosure.
Figure 8:
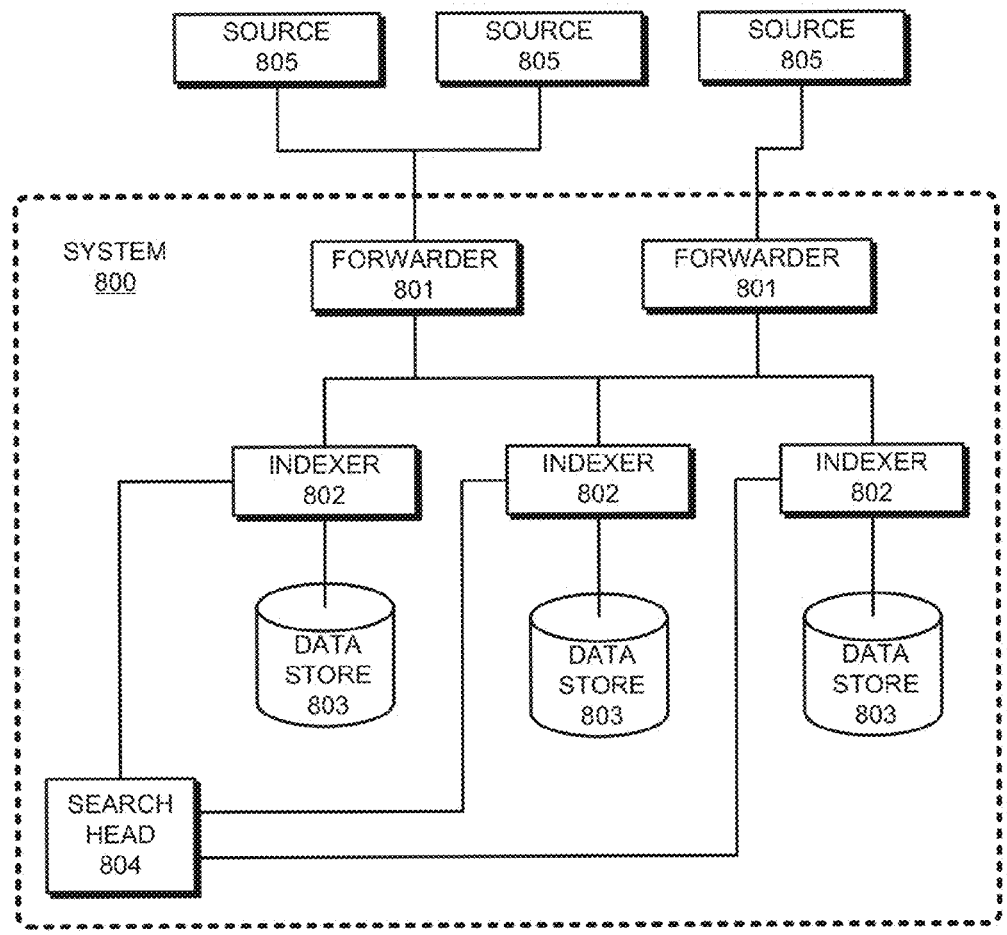
FIG. 8 presents a block diagram of an event-processing system in accordance with the disclosed embodiments.

FIG. 2 is a block diagram of an example field module 200. In general, the field module 200 may be implemented in the event-processing system 800 as shown in FIG. 8. The field module 200 may include a search query sub-module 210, field discovery sub-module 220, field selector sub-module 230, graphical user interface provider sub-module 240, filtering sub-module 250, and a data model generator sub-module 260. In alternative embodiments, the functionality of one or more of the sub-modules may be combined or divided.

As shown in FIG. 2, the field module 200 may include a search query sub-module 210. In some embodiments, the search query sub-module 210 may receive an initial search query from a user and may perform a search of source data to identify multiple events that satisfy the criteria of the initial search query. In some embodiments, an event may be identified as satisfying criteria of the initial search query when the event has a value for a field meeting field criteria of the initial search query.

The field discovery sub-module 220 may discover fields from the subset of the events that satisfy the criteria associated with the initial search query. In some embodiments, the fields may be discovered based on extraction rules as further described below with regard to FIGS. 8-14D. Furthermore, the extraction rules may be used to further discover values for the discovered fields.

The field selector sub-module 230 may select a subset of the discovered fields to be displayed in a graphical user interface (GUI). For example, the field discovery sub-module 220 may discover a first number of fields where each of the fields is included in at least one of the events that satisfies the criteria of the initial search query. The field selector sub-module 230 may select a second number (e.g., a subset or a portion) of the first number of fields. In some embodiments, the field selector sub-module 230 may select a particular field based on a number of events that include the particular field and/or based on a number of unique or different values for the particular field from the events that include the particular field. Further details with regard to selecting a field to be displayed in a GUI are disclosed in conjunction with FIGS. 3-7.

The graphical user interface (GUI) provider sub-module 240 may provide a GUI to be displayed to a user. For example, the GUI provider sub-module 240 may provide a display of the fields that were selected by the field selector sub-module 230. Accordingly, a subset of the fields of the events that satisfy criteria of the initial search query may be provided to a user through a GUI.

The filtering sub-module 250 may filter or refine the search (e.g., based on the initial search query) performed by the search query sub-module 210. For example, the filter sub-module 250 may filter the events that satisfy the criteria of the initial search query based on at least one criterion for one of the fields that was selected by the field selector sub-module 230. As an example, a search of source data including multiple events may be performed to return the events that satisfy criteria of the initial search query. Fields from the returned events may be discovered and a subset of the discovered fields may be selected to be displayed in a GUI. One or more of the fields that are displayed in the GUI may be selected by a user and the user may provide a criterion for the field. A search of the returned events may then be performed based on the criterion for the field that is selected through the GUI. Accordingly, a filtering operation may be performed on the events that were identified in response to the initial search query. In some embodiments, the filtering operation may be iteratively performed. For example, after a first filtering operation of the returned events, a further filtering may be performed to identify a further subset of fields. A portion of these fields may then be selected to be provided in the GUI and a subsequent filtering may be performed on the events that were returned in response to the first filtering operation.

The data model generator sub-module 260 may generate a data model based on the initial search query. In some embodiments, the data model generator sub-module 260 may further modify the data model based on the fields that are selected to be displayed in the GUI. For example, the data model may be modified based on specific fields that are selected in the GUI, such that a data model is created that (i) has either an enumerated set of events produced by the initial search query or is defined by the initial search query, and (ii) a set of attributes (or fields) that are defined for at least some events included in the data model (fields are described further below), where the set of fields in the created data model comprises the automatically discovered fields displayed in the GUI; applying the initial search query defining a data model to any relevant data set will produce a set of events that can be further searched or visualized using the set of attributes defined for the data model. Further details with regard to data models are disclosed in conjunction with FIG. 7.

Figure 3:
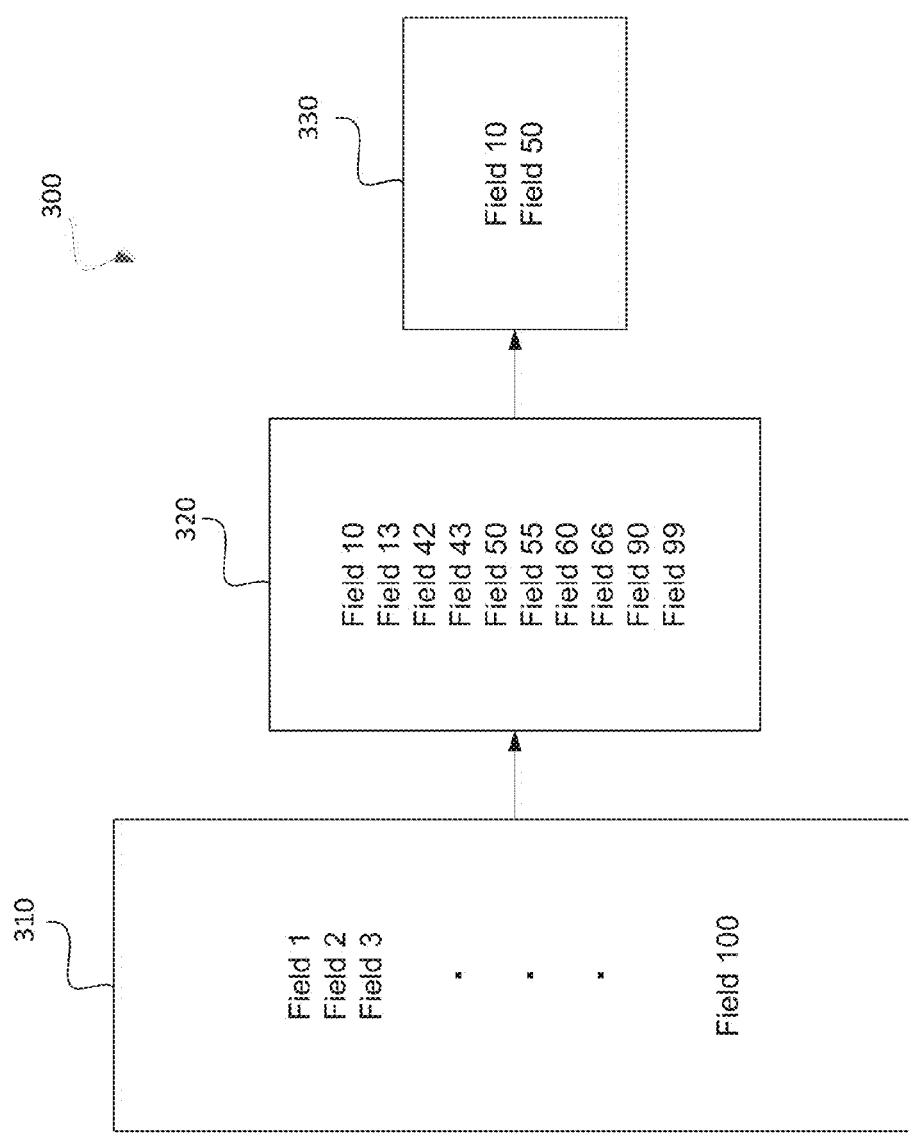
FIG. 3 illustrates an example scenario of selecting discovered fields to filter data returned in response to an initial search query in accordance with some embodiments.

FIG. 3 illustrates an example scenario 300 of selecting discovered fields to filter data returned in response to an initial search query. In general, the scenario 300 represents fields from events in source data, a subset of the fields that have been discovered from those events in the source data that satisfy criteria of an initial search query, and fields that have been selected to be displayed in a GUI. In some embodiments, the fields of the scenario 300 may be discovered, selected, and provided in a GUI by the field module 200 of FIG. 2.

As shown in FIG. 3, the group of fields 310 may represent fields that are included in events of source data. The group of fields 320 may represent a subset of the fields from the group of fields 310. For example, the group of fields 320 may represent fields from events that satisfy criteria of an initial search query. Accordingly, the group of fields 320 may include fewer fields than the group of fields 310. Furthermore, the group of fields 330 may represent a subset of the fields from the group 320 (and a subset of the group 310). For example, the group of fields 330 may represent specific fields that have been selected to be displayed in a graphical user interface so that one or more criteria may be provided for one or more of the specific fields to filter events returned in response to a search.

As an example, the group of fields 310 may be fields from 1,000 events that are included in source data. The 1000 events may include 100 different fields. A search may be performed on the 1,000 events and 200 of the events may be determined to satisfy the criteria of the search query. The fields of the 200 events may be discovered. For example, ten fields may be discovered as being present in any of the 200 events. A portion of the ten fields may be selected to be provided in a GUI. For example, two of the ten fields may be selected to be displayed in the GUI. Subsequently, a user may provide one or more criteria for one or both of the two fields displayed in the GUI and a filtering operation may be performed on the 200 events that satisfied the criteria of the initial search query.

Figure 4:
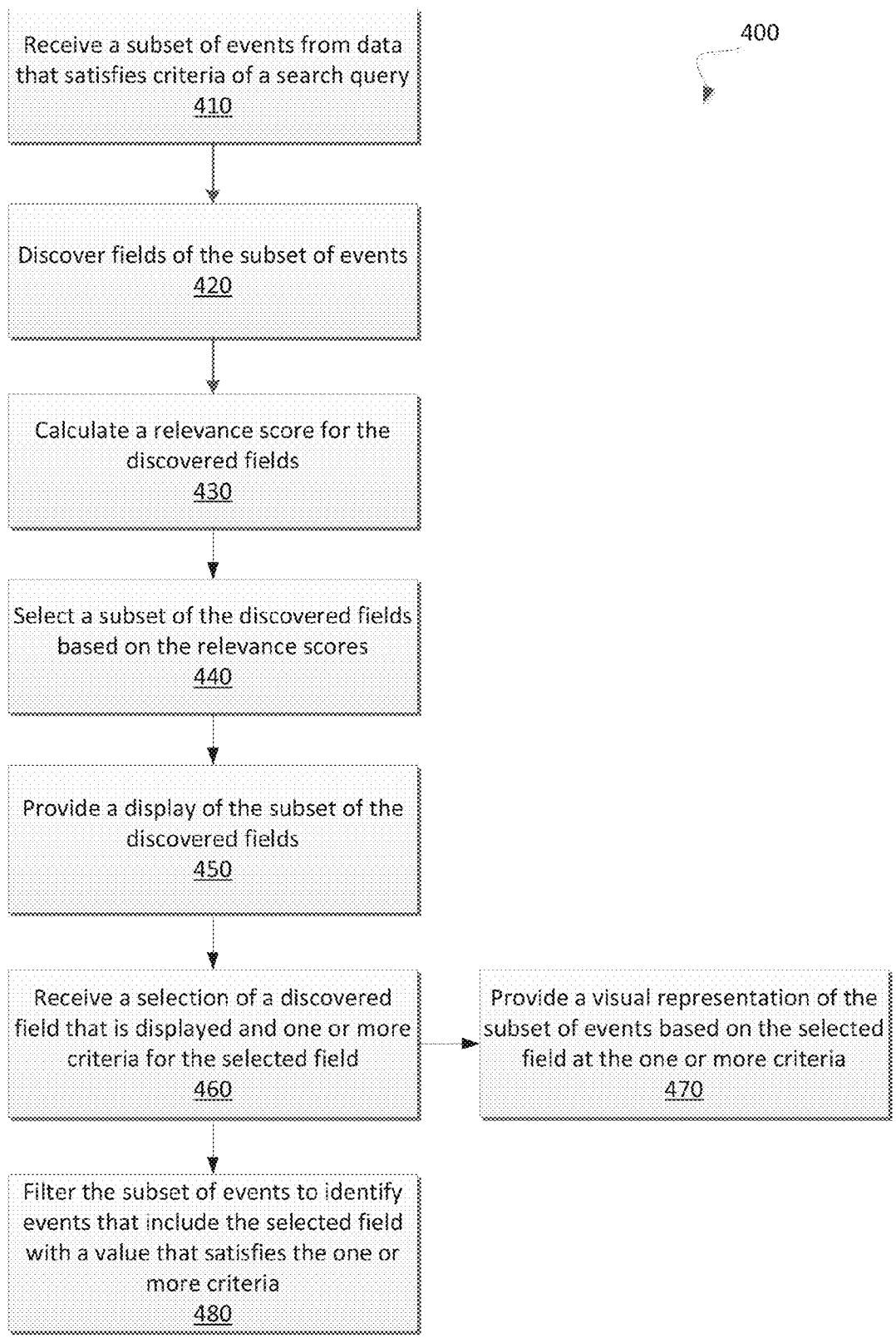
FIG. 4 illustrates an example method to provide a visual representation of events returned in response to an initial search query and to filter the returned events based on one or more criteria associated with a field in accordance with some embodiments of the disclosure.

FIG. 4 illustrates an example method 400 to provide a visual representation of events returned in response to an initial search query and to further search the returned events based on one or more criteria associated with a field. In general, the method 400 may be performed by processing logic that may comprise hardware (e.g., a processing device, circuitry, dedicated logic, programmable logic, microcode, etc.), software (e.g., instructions run on a processing device), or a combination thereof. In some embodiments, the method 400 may be performed by a field module 200 of FIG. 2.

As shown in FIG. 4, the method 400 may begin by the processing logic receiving a subset of events that satisfies criteria of a search query (block 410). For example, a search may be performed on data that includes multiple events. A subset of the events that satisfies the criteria of a search query (i.e., the initial search query) may be returned. The processing logic may further discover fields of the subset of events (block 420). For example, the fields that are included in any event of the subset of events that satisfies the criteria of the initial search query may be discovered. The fields may be discovered based on extraction rules as further described below with regard to FIGS. 8-14D. The processing logic may further calculate a relevance score for the identified fields (block 430). In some embodiments, a relevance score may indicate which fields may be of particular interest for being used to refine the initial search query. For example, a relevance score may be calculated for each of the fields that have been discovered in any of the subset of the events. In some embodiments, the relevance score for a field may be based on a number of unique or different values of the field from any event of the subset of events. In the same or alternative embodiments, the relevance score for the field may be based on a number of events from the subset of events that include the field. In some embodiments, the relevance score may be calculated based on both the number of different values of the field and the number of events that include the field. Further details with regard to the relevance score for a field are disclosed in conjunction with FIG. 6.

Referring to FIG. 4, the processing logic may select a subset of the identified fields based on the relevance scores (block 440). As an example, a field with a high relevance score may be selected and a field with a low relevance score may not be selected. The processing logic may further provide a display of the subset of the discovered fields (block 450). For example, a graphical user interface may be provided to display the subset of the discovered fields that includes the fields with the highest relevance scores. Furthermore, the processing logic may receive a selection of a field that is displayed and one or more criteria for the selected field (block 460). For example, a user input via the graphical user interface that specifies one or more criteria for a particular field may be received. In some embodiments, the user input may include one or more criteria for multiple fields. For example, a user may provide at least one criterion corresponding to a first field that is provided by the GUI and a second at least one criterion corresponding to a second field that is also provided by the GUI.

The processing logic may subsequently provide a visual representation of the subset of the events based on the selected field and one or more criteria of the selected field (block 470) and/or may filter the events returned in response to the initial search query to identify those events that include a value that satisfies one or more criteria provided by the user for the selected field (block 480). For example, a visual representation of the subset of events may include an identification of a number of events that include the selected field at a value that satisfies one or more criteria and a number of events that do not include the selected field at a value that satisfies one or more criteria. In some embodiments, the visual representation of the subset of events may be specified through a graphical user interface as disclosed with regard to FIG. 5C. In the same or alternative embodiments, the filtering of the subset of events for events that include the selected field at the value that satisfies one or more criteria for the selected field may perform a filtering operation on the subset of events to identify specific events of the subset of events that include the selected field and that have a value for the field that satisfies the one or more criteria for the selected field. Further details with regard to a GUI to display the fields to be selected to perform the filtering operation are disclosed with regard to FIG. 5B.

Figure 5A:
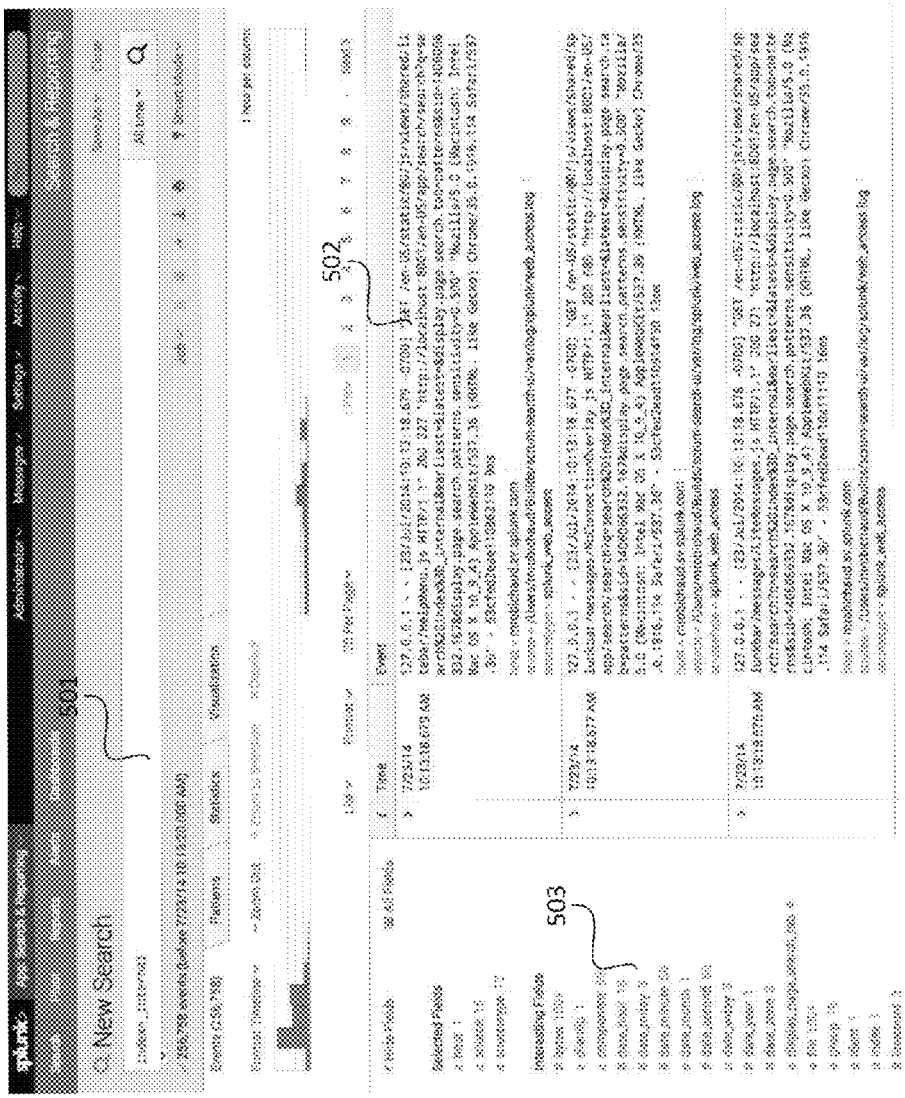
FIG. 5A illustrates an example graphical user interface displaying events returned in response to a search query in accordance with some embodiments.

FIG. 5A illustrates an example graphical user interface 500 displaying events returned in response to a search query. In general, the graphical user interface 500 may correspond to a graphical user interface that is provided by a field module 200 of FIG. 2.

As shown in FIG. 5A, the graphical user interface 500 may include a search query box 501, a search results section 502, and a fields section 503. In some embodiments, an initial search query may be input into the search query box 501 by a user and the user may submit the initial search query to perform a search of source data. In response to the searching of the source data based on the initial search query, a subset of the events may be returned and displayed. For example, a portion or all of the events that satisfy criteria of the initial search query may be displayed in the search results section 502. Furthermore, in some embodiments, the fields section 503 may display certain fields that are included in the events that satisfy the criteria of the initial search query. For example, the fields section 503 may display fields that have high relevance scores (as described in further detail below), where each field can be displayed with the number of events that include this field and/or the number of unique or different values the events have for this field. In some embodiments, the fields section 503 may further display the relevance score that has been calculated for each of the fields displayed in the fields section 503.

FIG. 5B illustrates an example graphical user interface 510 displaying fields discovered from the events that were returned in response to an initial search query. In general, the graphical user interface 510 may correspond to a graphical user interface that is provided by a field module 200 of FIG. 2. The graphical user interface 510 may be displayed after a user has performed an initial search of source data based on the initial search query (e.g., from the graphical user interface 500).

As shown in FIG. 5B, the graphical user interface 510 may display multiple fields that have been discovered after an initial search of source data. For example, the graphical user interface 510 may display a field identifier column 511, field values column 512, and field coverage column 513. In some embodiments, the field identifier column 511 may display fields that were discovered after the initial search of data. The field values column 512 may display a number of different or unique values for a field in the field identifier column 511. For example, as shown, field "source" includes 15 different source addresses. Furthermore, the field coverage column 513 may display a percentage of events returned in response to the initial search that include a particular field. For example, all (100 percent of) events returned in response to the initial search query include field "source." In some embodiments, a user may manually select all or some of the fields (e.g., by using a check box) to be further displayed in the GUI so that the user may provide one or more criteria for the selected field to perform a filtering operation as previously described. In the same or alternative embodiments, at least a portion of the check boxes corresponding to fields may be automatically (without user input) checked or selected based on the relevance scores that are calculated for the fields.

Figure 5C:
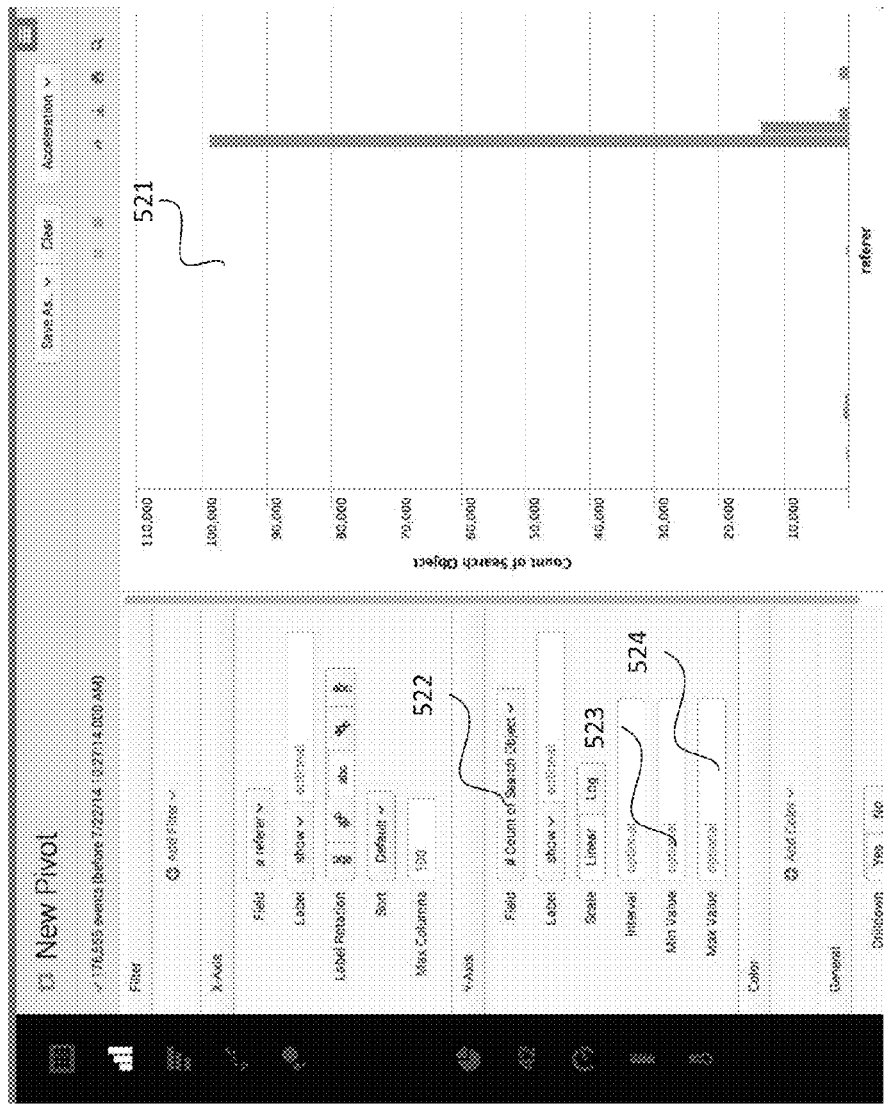
FIG. 5C illustrates an example graphical user interface displaying fields that may be selected to provide a visualization of the data in accordance with some embodiments.

FIG. 5C illustrates an example graphical user interface 520 displaying fields that may be selected to provide a visualization of the data. In general, the graphical user interface 520 may correspond to a graphical user interface that is provided by a field module 200 of FIG. 2. The graphical user interface 520 may be displayed after a user has performed an initial search of the source data and after fields of certain events returned in response to the initial search query have been automatically discovered (or, after discovery, additionally selected such as via the graphical user interface 510).

As shown in FIG. 5C, the graphical user interface 520 may provide a visualization of data. For example, the visualization of the data may include a graph or a chart that provides a summary of the data. The visualization of the data may be provided by a pivot table that can provide information associated with the events that have been returned in response to the initial search query. A user may modify the visualization of the data by specifying a particular field to visualize the data. For example, a visualization 521 of the data may be modified based on a user selecting a field from the field box 522. In some embodiments, the field box 522 may include multiple fields that may be selected to determine how to visualize the data. For example, a user may select a field from the field box 522 and one or more criteria (e.g., a minimum value 523 and a maximum value 524) for the field to provide the visualization 521 of the data based on the field selected from the field box 522.

Figure 6:
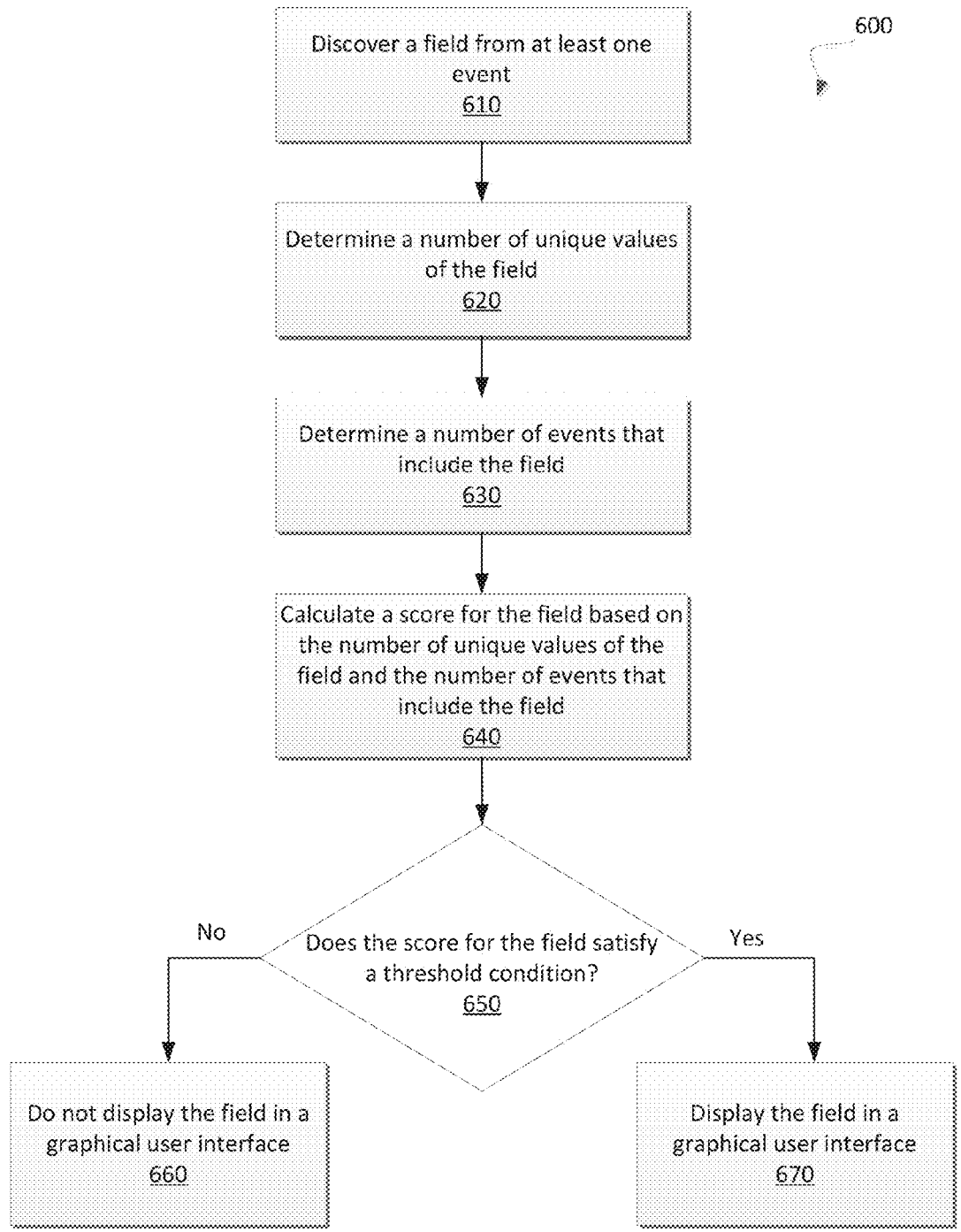
FIG. 6 illustrates an example method to determine when to display a field from the events returned in response to an initial search query in accordance with some embodiments of the disclosure.

FIG. 6 illustrates an example method 600 to determine when to display a field from the events returned in response to an initial search query. The method 600 may be performed by processing logic that may comprise hardware (e.g., a processing device, circuitry, dedicated logic, programmable logic, microcode, etc.), software (e.g., instructions run on a processing device), or a combination thereof. In some embodiments, the method 600 may be performed by a field module 200 of FIG. 2.

As shown in FIG. 6, the method 600 may begin by the processing logic discovering a field from at least one event (block 610). For example, a field from events of data that have been returned in response to an initial search query may be identified. The processing logic may further determine a number of unique values for the field (block 620). For example, the processing logic may identify each returned event that includes the field and, for all such returned events, may determine the total number of unique or different values that are included in the field. Additionally, the processing logic may determine the number of returned events that include the field (block 630).

The processing logic may calculate a relevance score for the field based on the number of different or unique values of the field and the number of events that include the field (block 640). For example, the relevance score for a field may be calculated by the following equation:

$$\text{Relevance Score} = V(f)^e * P(f)^i$$

In some embodiments, V(f) may refer to the variance of a particular field, where the variance represents the number of unique or different values for the field from various events, and P(f) may refer to a percentage of the events that include the particular field. In the same or alternative embodiments, the variables 'e' and 'i' may be tunable parameters that can be preselected (e.g., automatically by the processing logic) based on a percentage of fields that should be selected to be displayed in a GUI. Accordingly, a relevance score for a particular field from multiple fields that are included in one or more events may be calculated based on (i) the number of unique or different values that are included in the field for various events, (ii) the number of the events that include the field, and (iii) a percentage or ratio of fields that should be selected to be displayed in the GUI. In some embodiments, a field that has more unique or different values and more events that include the field may have a higher relevance score than a field that has less unique or different values and less events that include the field. Furthermore, a higher relevance score may result in a field being more likely to be selected to be displayed in the GUI than a field with a lower relevance score. Additionally, a higher percentage of fields that should be selected to be displayed in the GUI may result in the display of more fields than a lower percentage of fields that should be selected to be displayed in the GUI.

Referring to FIG. 6, the processing logic may determine if the score for the field satisfies a threshold condition (block 650). If the relevance score that is calculated for the field satisfies the threshold condition, then the field may be displayed in a graphical user interface (block 670). However, if the relevance score that is calculated for the field does not satisfy the threshold condition, then the field may not be displayed in the graphical user interface (block 660). In some embodiments, the threshold condition may be based on a percentage of fields that are to be displayed in the graphical user interface. For example, a defined percentage of fields are to be displayed and a number of the fields that are required to satisfy the defined percentage may be displayed. The fields that are displayed to satisfy the defined percentage may be fields associated with higher calculated relevance scores. In the same or alternative embodiments, the threshold condition may be based on a total number of fields that are to be displayed in the graphical user interface. For example, the fields with the highest calculated relevance score may be displayed in the graphical user interface and the total number of such displayed fields may be defined by the threshold condition. Furthermore, the threshold condition may be based on a threshold relevance score. For example, fields with a calculated relevance score that meets or exceeds the threshold relevance score may be displayed in the graphical user interface while fields with a calculated relevance score that does not meet or exceed the threshold relevance score may not be displayed in the graphical user interface.

Figure 7:
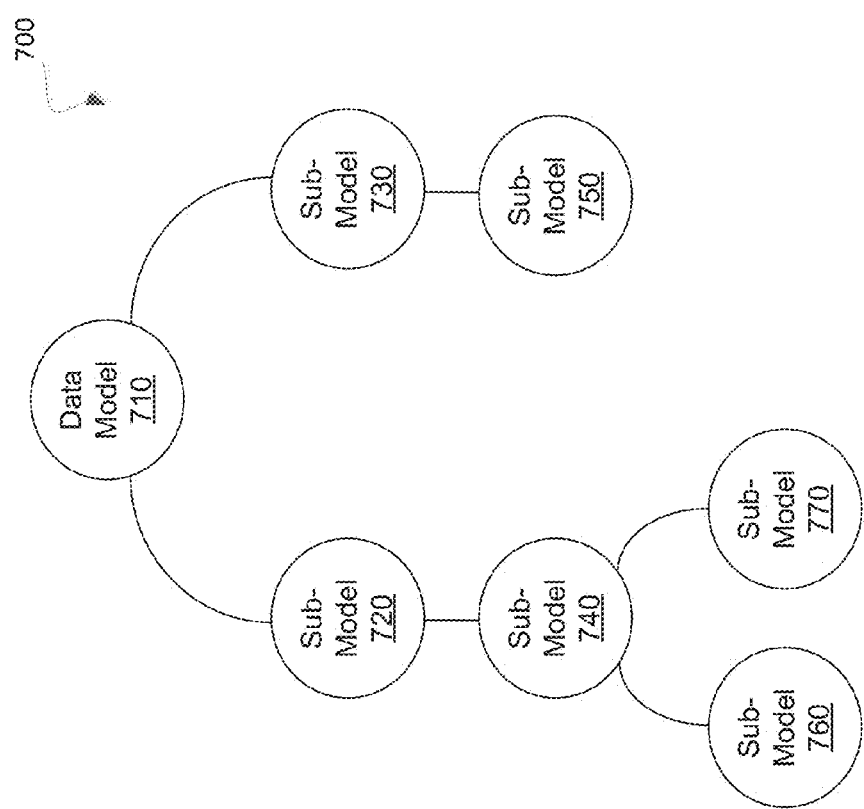
FIG. 7 illustrates an example of a data model in accordance with some embodiments of the present disclosure.

FIG. 7 illustrates an example of a data model 700 in accordance with some embodiments of the present disclosure. In general, the data model 700 may be generated by a field module 200 of FIG. 2. Furthermore, the data model 700 may be generated after an initial search query has been performed on events of data and may further be modified after the providing of one or more criteria for particular fields for a filtering operation (i.e., a filtering search query).

A data model can refer to a hierarchically structured search-time mapping of semantic knowledge about source data containing events. The data model encodes the domain knowledge necessary to build a variety of specialized searches of those events. Examples of a data model can include, and are not limited to, data models pertaining to authentication, databases, electronic mail, intrusion detection, malware, application state, alerts, compute inventory, network sessions, network traffic, performance, audits, updates, and vulnerabilities.

A data model can include one or more data sub-models to group the source data according to certain criteria. For example, the authentication data model can pertain to events for all types of authentication (e.g., successful authentication, failed authentication, privileged authentication), and the authentication data model can have a "Successful_Authentication" data sub-model, a "Failed_Authentication" data sub-model, a "Privileged_Authentication" data sub-model, etc.

Each data model or sub-model can have fields that are associated with certain events. For example, the authentication data model can have fields that are related to events pertaining to authentication, including a field indicating the machine for which a login is being attempted, a field indicating the status of whether the login attempt is successful or has failed, a field indicating the time the login attempt was made, etc.

A data sub-model is a child of a parent data model. In one implementation, a data sub-model corresponds to a subset of the events of the parent model and has a subset of fields of the parent model and/or additional fields. For example, the data sub-model "Failed_Authentication" can be a child of the "Authentication" data model, where the field "authentication result" is selected and provided with the value of "failed."

In summary, a data model may be defined by a search and a set of fields (called attributes), each of which is defined for at least one of the events that would be produced by the search. A sub-model (a child of the parent data model) may be defined by a (typically narrower) search that produces a subset of the events that would be produced by the parent data model's search; the sub-model's fields (attributes) would include a subset of the fields of the parent data model and/or additional fields. A data model may be automatically created in the context of the present disclosure when fields are automatically discovered in events produced by an initial search query; the initial search query may become the data model's search, and the automatically discovered fields (or the subset of those that the software determines should be displayed in the GUI) may be the fields (attributes) associated with the data model. Data models may be selected and used to provide a GUI that makes it easy for a business user to select and enter criteria for further filtering events produced by the data model's search query.

As shown in FIG. 7, the data model 700 may represent a type of event and subtypes associated with the type of event. For example, a type of event may correspond to certain search criteria (e.g., location=California) that define one or more event characteristics and may be used to perform a search to identify events that match the event characteristics. In some embodiments, the data model may include fields that may be used to generate a search query. Such a search query may return a particular set of events based on the fields and optionally specific values of one or more of the fields in the events being searched. For example, a data model may be selected to perform a search of source data that returns events that satisfy criteria defined by the data model.

Referring to FIG. 7, the data model 700 may include a top level data model that may be referred to as a root data model 710. In some embodiments, the root data model 710 may represent a type of event. Each of the data sub-models 720, 730, 740, 750, 760, and 770 may be referred to as child of the data model 710. In some embodiments, the root data model 710 may represent a broader category of events and the data sub-models 720-770 may represent different subsets of the events that are represented by the root data model 710.

In some embodiments, a data sub-model may inherit a subset of the fields of the parent data model and/or may have additional fields, and the events to which the sub-model applies may be determined by adding additional filtering criteria (e.g., relating to field criteria) to the set of events (or search query) defining the parent data model such that the events associated with the sub-model are a subset of the events associated with the parent data model when both the parent and child data models are applied to the same source data. The root data model 710 may be associated with a first criterion for a first field (its search). The data sub-models 720 and 730 may also be associated with the first criterion for the first field. However, in some embodiments, the data sub-model 720 may also be associated with a second criterion for the first field or a second field, and the data sub-model 730 may be associated with a third criterion for the first field or a third field. Accordingly, if the root data model 710 is selected to perform a search, more events may be returned than if one of the data sub-models 720 or 730 is selected to perform a search on the same data.

The data model 700 may be applied to search any data and may define criteria of a search query. For example, with reference to the previous discussion, if the parent data model 710 is selected to perform a search, then the events that satisfy the search criteria defined by the data model 710 may be returned. However, if the data sub-model 720 is selected to perform a search on the same data, then the events of the data that satisfy the search criteria defined by the data sub-model 720 may be returned. A search that is performed based on the search criteria of the data sub-model may result in fewer returned events than if a parent data model 710 is selected to perform a search on the same data.

Accordingly, a data model may be used to define different hierarchical levels to perform searches on data. The data model may be saved and applied to various different events. In some embodiments, the field module 200 and the GUI as previously described may be used to generate a data model based on a search of data. For example, in response to an initial search query, a data model may be generated based on the initial search query. In some embodiments, the criteria of the initial search query may be associated with the root data model that is generated in response to the initial search query. Furthermore, when one or more automatically discovered fields are displayed in the GUI, the data model includes those fields as its attributes. A sub-model may be generated by receiving additional filtering criteria for fields through the GUI, and then a narrower search incorporating the initial search query's criteria and the criteria entered through the GUI defines the events associated with the sub-model, and automatically discovered fields determined to be of importance in the set of events generated by the filtered results using the criteria entered through the GUI are the sub-model's fields (attributes).

The data model that is generated based on the initial search query and modified based on values for the fields displayed in the GUI may be saved and used to perform searches of other data. For example, the data model may be generated after an initial search query of source data and may further be modified based on discovered fields of the events of the source data that are returned in response to the initial search query. The data model may be saved and subsequently applied to perform a search of events of different source data.

The systems and methods described herein above may be employed by various data processing systems (e.g., data aggregation and analysis systems). In various illustrative examples, the data processing system may be represented by the SPLUNK® ENTERPRISE system produced by Splunk Inc. of San Francisco, Calif., to store and process performance data. The present disclosure may facilitate the analysis and search of the performance data.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a pre-defined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule." In some embodiments, an extraction rule may be identified automatically (e.g., auto-discovery) or by being specified within a particular file (e.g., a configuration file). In the same or alternative embodiments, an extraction rule may also be defined by a search query. For example, the search query may define a field and may further perform computations that may be named as fields.

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to discover equivalent fields from different types of events generated by different data sources, the system facilitates use of a "common information model" (CIM) across the different data sources.

FIG. 8 presents a block diagram of an exemplary event-processing system 800, similar to the SPLUNK® ENTERPRISE system. System 800 includes one or more forwarders 801 that collect data obtained from a variety of different data sources 805, and one or more indexers 802 that store, process, and/or perform operations on this data, wherein each indexer operates on data contained in a specific data store 803. These forwarders and indexers can comprise separate computer systems in a data center, or may alternatively comprise separate processes executing on various computer systems in a data center.

During operation, the forwarders 801 identify which indexers 802 will receive the collected data and then forward the data to the identified indexers. Forwarders 801 can also perform operations to strip out extraneous data and detect timestamps in the data. The forwarders next determine which indexers 802 will receive each data item and then forward the data items to the determined indexers 802.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 800 and the processes described below with respect to FIGS. 8-14D are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Figure 9:
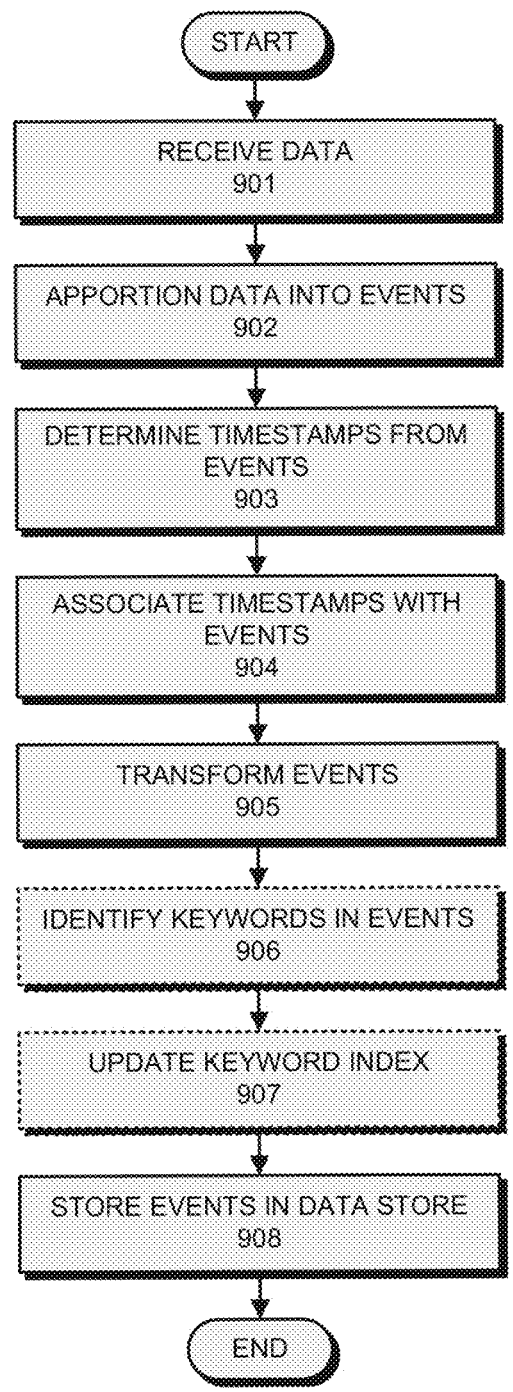
FIG. 9 presents a flowchart illustrating how indexers process, index, and store data received from forwarders in accordance with the disclosed embodiments.

FIG. 9 presents a flowchart illustrating how an indexer processes, indexes, and stores data received from forwarders in accordance with the disclosed embodiments. At block 901, the indexer receives the data from the forwarder. Next, at block 902, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 903. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 904, for example by storing the timestamp as metadata for each event.

Then, the system can apply transformations to data to be included in events at block 905. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 906. Then, at block 907 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 908, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 802 is responsible for storing and searching a subset of the events contained in a corresponding data store 803. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

Figure 10:
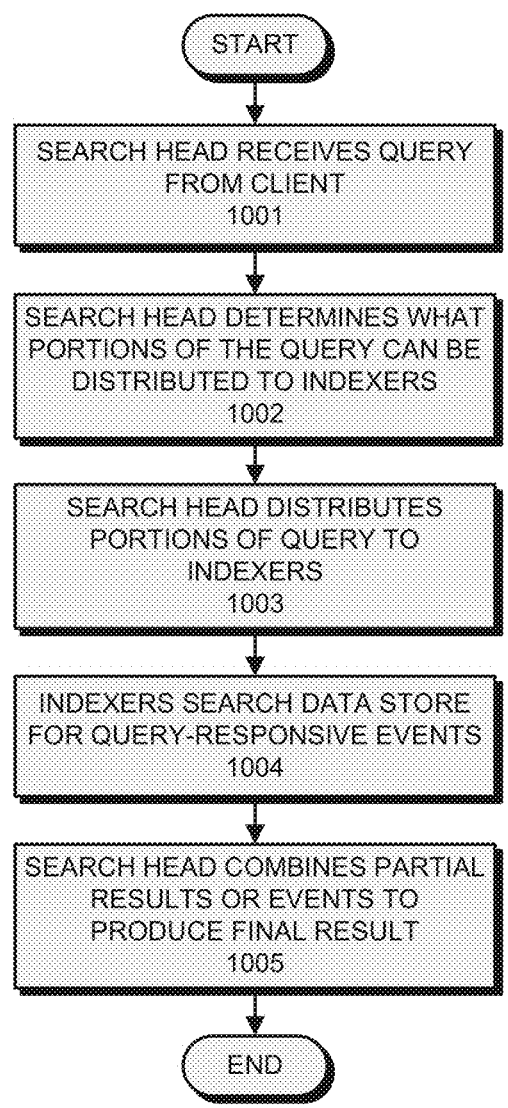
FIG. 10 presents a flowchart illustrating how a search head and indexers perform a search query in accordance with the disclosed embodiments.

FIG. 10 presents a flowchart illustrating how a search head and indexers perform a search query in accordance with the disclosed embodiments. At the start of this process, a search head receives a search query from a client at block 1001. Next, at block 1002, the search head analyzes the search query to determine what portions can be delegated to indexers and what portions need to be executed locally by the search head. At block 1003, the search head distributes the determined portions of the query to the indexers. Note that commands that operate on single events can be trivially delegated to the indexers, while commands that involve events from multiple indexers are harder to delegate.

Then, at block 1004, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1004 may involve using the late-binding scheme to extract values for specified fields from events at the time the query is processed. Next, the indexers can either send the relevant events back to the search head, or use the events to calculate a partial result, and send the partial result back to the search head.

Finally, at block 1005, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 800 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

Figure 11:
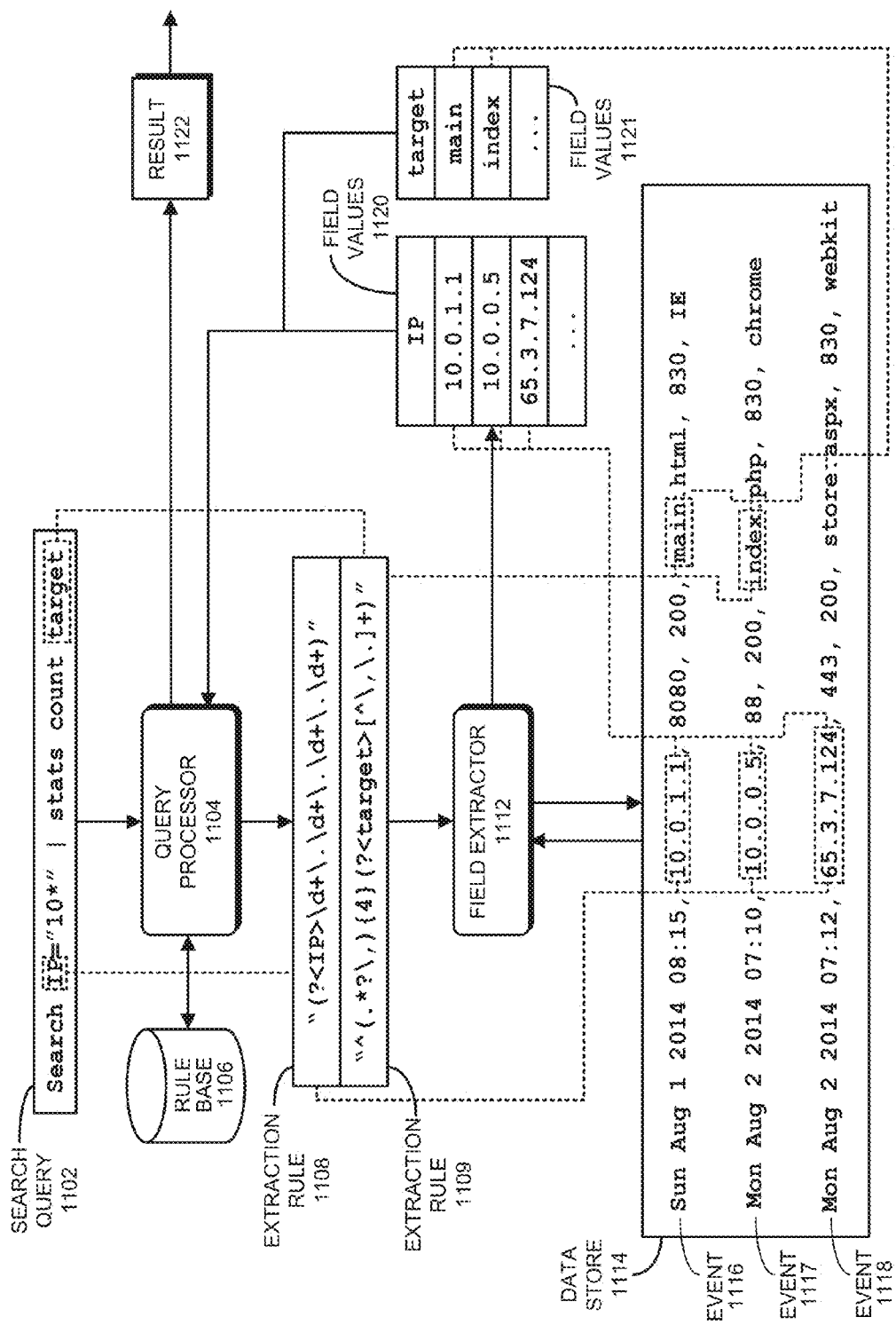
FIG. 11 presents a block diagram of a system for processing search requests that uses extraction rules for field values in accordance with the disclosed embodiments.

FIG. 11 presents a block diagram illustrating how fields can be extracted during query processing in accordance with the disclosed embodiments. At the start of this process, a search query 1102 is received at a query processor 1104. Query processor 1104 includes various mechanisms for processing a query, wherein these mechanisms can reside in a search head 804 and/or an indexer 802. Note that the exemplary search query 1102 illustrated in FIG. 11 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1102 can also be expressed in other query languages, such as the Structured Query Language ("SQL") or any suitable query language.

Upon receiving search query 1102, query processor 1104 sees that search query 1102 includes two fields "IP" and "target." Query processor 1104 also determines that the values for the "IP" and "target" fields have not already been extracted from events in data store 1114, and consequently determines that query processor 1104 needs to use extraction rules to extract values for the fields. Hence, query processor 1104 performs a lookup for the extraction rules in a rule base 1106, wherein rule base 1106 maps field names to corresponding extraction rules and obtains extraction rules 1108-1109, wherein extraction rule 1108 specifies how to extract a value for the "IP" field from an event, and extraction rule 1109 specifies how to extract a value for the "target" field from an event. As is illustrated in FIG. 11, extraction rules 1108-1109 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 1104 sends extraction rules 1108-1109 to a field extractor 1112, which applies extraction rules 1108-1109 to events 1116-1118 in a data store 1114. Note that data store 1114 can include one or more data stores, and extraction rules 1108-1109 can be applied to large numbers of events in data store 1114, and are not meant to be limited to the three events 1116-1118 illustrated in FIG. 11. Moreover, the query processor 1104 can instruct field extractor 1112 to apply the extraction rules to all the events in a data store 1114, or to a subset of the events that have been filtered based on some criteria.

Next, field extractor 1112 applies extraction rule 1108 for the first command "Search IP="10*"" to events in data store 1114 including events 1116-1118. Extraction rule 1108 is used to extract values for the IP address field from events in data store 1114 by looking for a pattern of one or more digits, followed by a period, followed again by one or more digits, followed by another period, followed again by one or more digits, followed by another period, and followed again by one or more digits. Next, field extractor 1112 returns field values 1120 to query processor 1104, which uses the criterion IP="10*" to look for IP addresses that start with "10".

Note that events 1116 and 1117 match this criterion, but event 1118 does not, so the result set for the first command is events 1116-1117.

Query processor 1104 then sends events 1116-1117 to the next command "stats count target." To process this command, query processor 1104 causes field extractor 1112 to apply extraction rule 1109 to events 1116-1117. Extraction rule 1109 is used to extract values for the target field for events 1116-1117 by skipping the first four commas in events 1116-1117, and then extracting all of the following characters until a comma or period is reached. Next, field extractor 1112 returns field values 1121 to query processor 1104, which executes the command "stats count target" to count the number of unique values contained in the target fields, which in this example produces the value "2" that is returned as a final result 1122 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

Figure 13A:
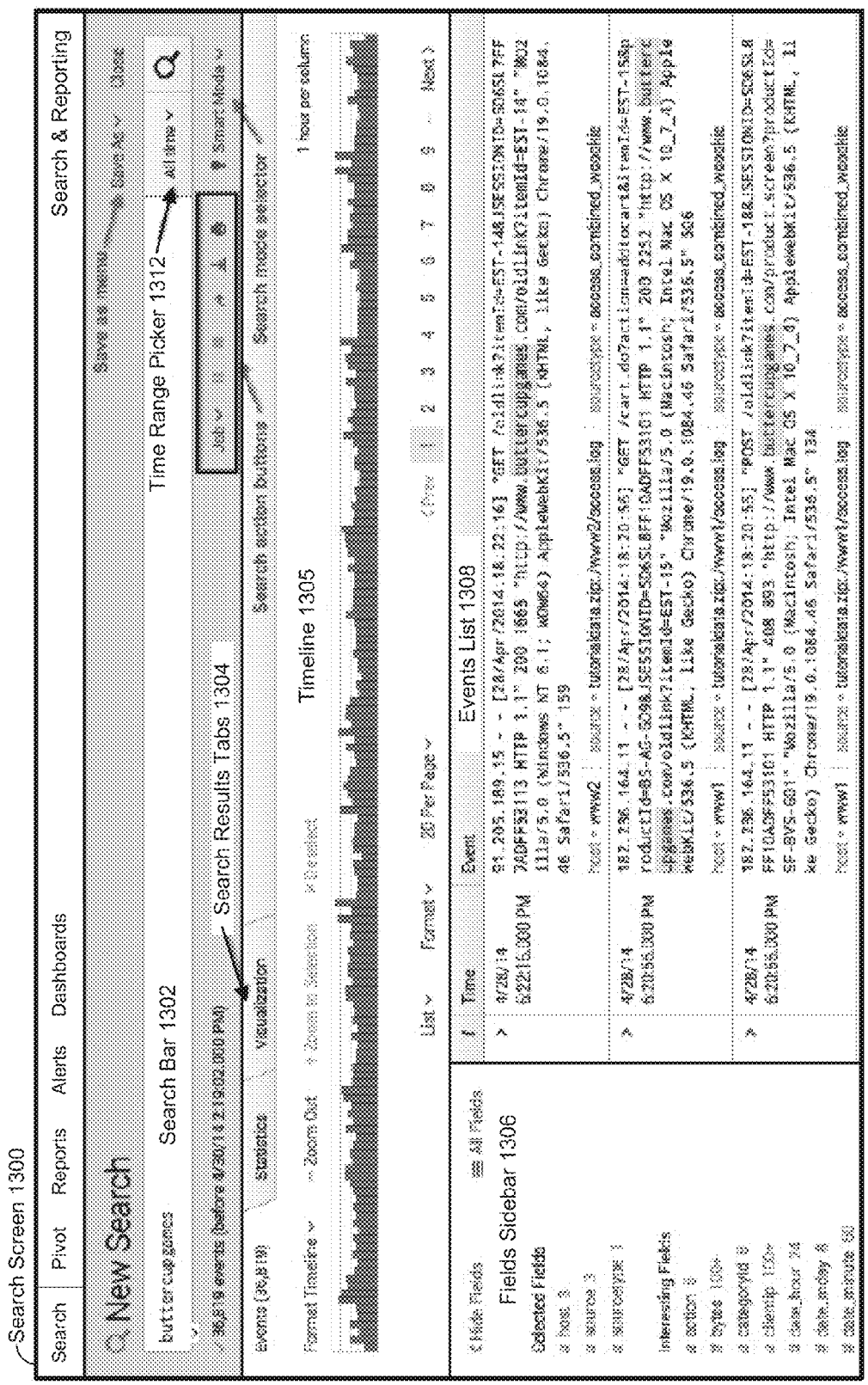
FIG. 13A illustrates a search screen in accordance with the disclosed embodiments.
Figure 13B:
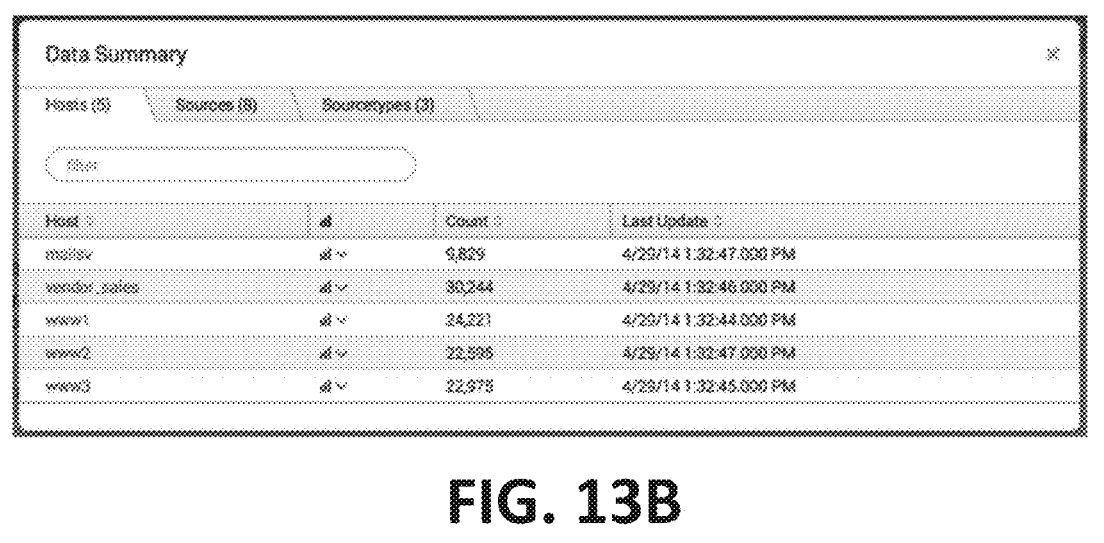

FIG. 13A illustrates an exemplary search screen 1300 in accordance with the disclosed embodiments. Search screen 1300 includes a search bar 1302 that accepts user input in the form of a search string. It also includes a time range picker 1312 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 1300 also initially displays a "data summary" dialog as is illustrated in FIG. 13B that enables the user to select different sources for the event data, for example by selecting specific hosts and log files.

After the search is executed, the search screen 1300 can display the results through search results tabs 1304, wherein search results tabs 1304 includes: an "events tab" that displays various information about events returned by the search; a "statistics tab" that displays statistics about the search results; and a "visualization tab" that displays various visualizations of the search results. The events tab illustrated in FIG. 13A displays a timeline graph 1305 that graphically illustrates the number of events that occurred in one-hour intervals over the selected time range. It also displays an events list 1308 that enables a user to view the raw data in each of the returned events. It additionally displays a fields sidebar 1306 that includes statistics about occurrences of specific fields in the returned events, including "selected fields" that are pre-selected by the user, and "interesting fields" that are automatically selected by the system based on pre-specified criteria.

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

To facilitate faster query processing, a query can be structured as a map-reduce computation, wherein the "map" operations are delegated to the indexers, while the corresponding "reduce" operations are performed locally at the search head. For example, FIG. 12 illustrates how a search query 501 received from a client at search head 804 can split into two phases, including: (1) a "map phase" comprising subtasks 502 (e.g., data retrieval or simple filtering) that may be performed in parallel and are "mapped" to indexers 802 for execution, and (2) a "reduce phase" comprising a merging operation 503 to be executed by the search head when the results are ultimately collected from the indexers.

During operation, upon receiving search query 501, search head 804 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 10, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

As described above with reference to the flow charts in FIGS. 9 and 10, event-processing system 800 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

To speed up certain types of queries, some embodiments of system 800 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 14A:
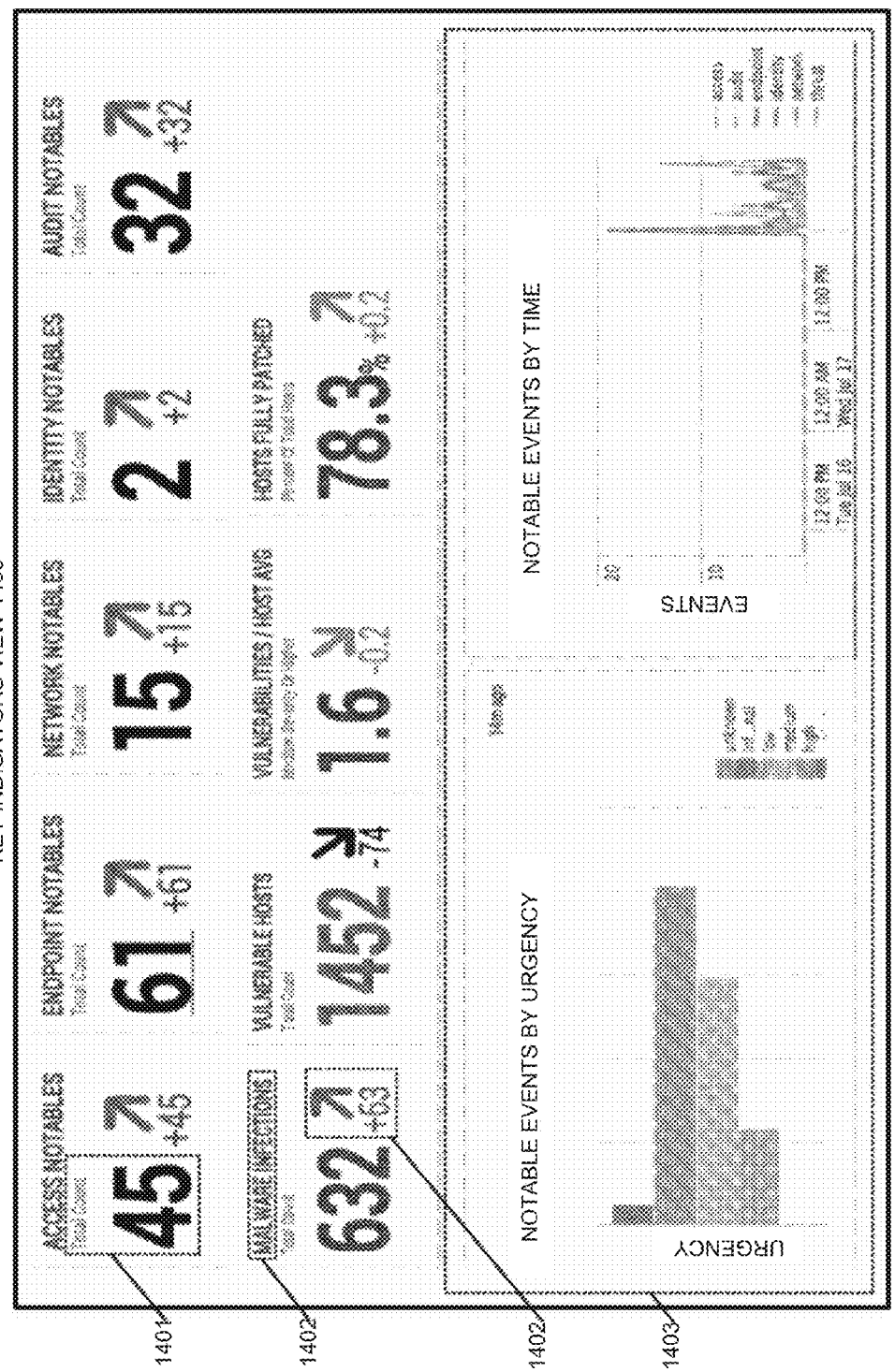
FIG. 14A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 14A illustrates an exemplary key indicators view 700 that comprises a dashboard, which can display a value 1401, for various security-related metrics, such as malware infections 1402. It can also display a change in a metric value 1403, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 14B:
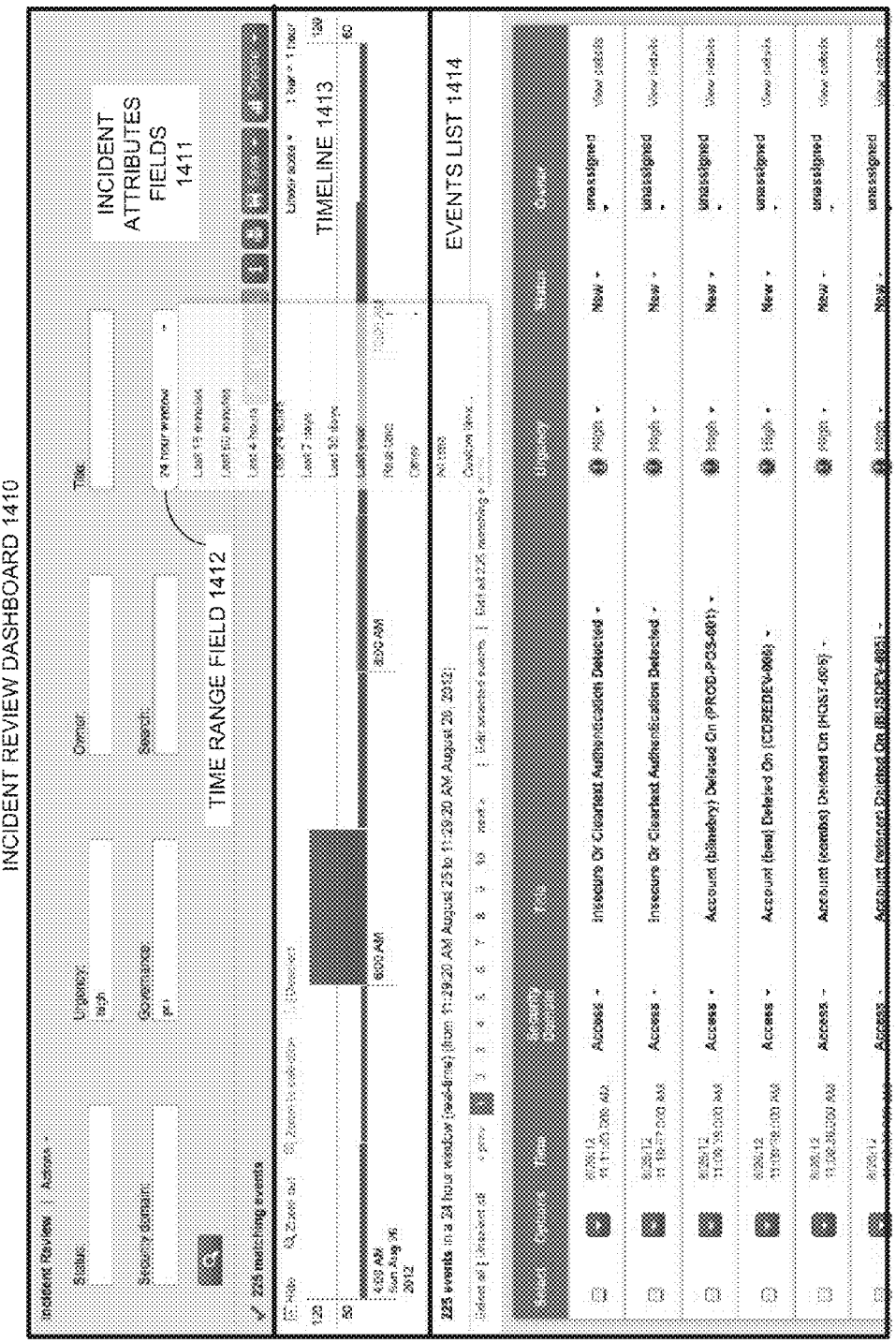
FIG. 14B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 14B illustrates an exemplary incident review dashboard 1410 that includes a set of incident attribute fields 1411 that, for example, enables a user to specify a time range field 1412 for the displayed events. It also includes a timeline 1413 that graphically illustrates the number of incidents that occurred in one-hour time intervals over the selected time range. It additionally displays an events list 1414 that enables a user to view a list of all of the notable events that match the criteria in the incident attributes fields 1411. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 14C:
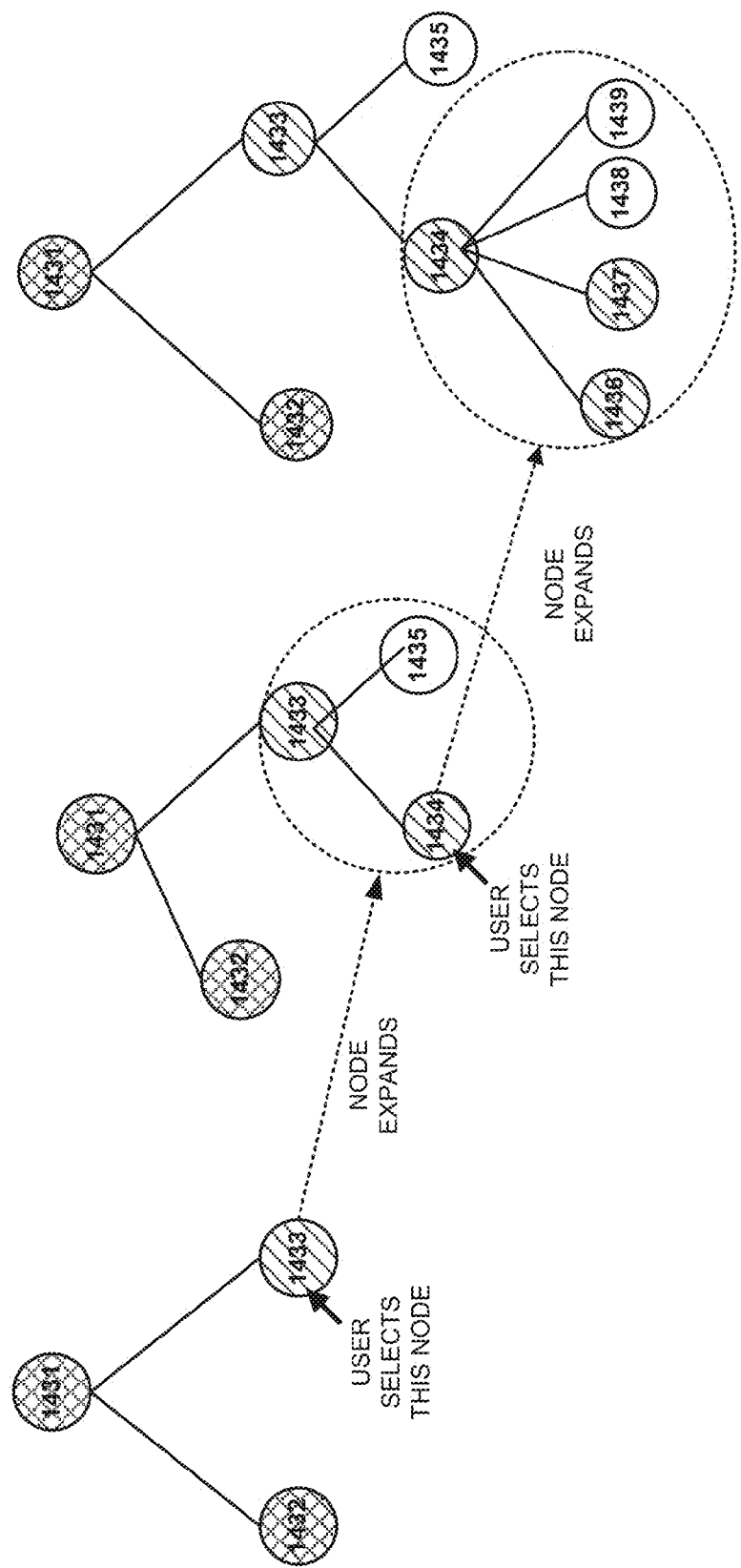
FIG. 14C illustrates a proactive monitoring tree in accordance with the disclosed embodiments.
Figure 14D:
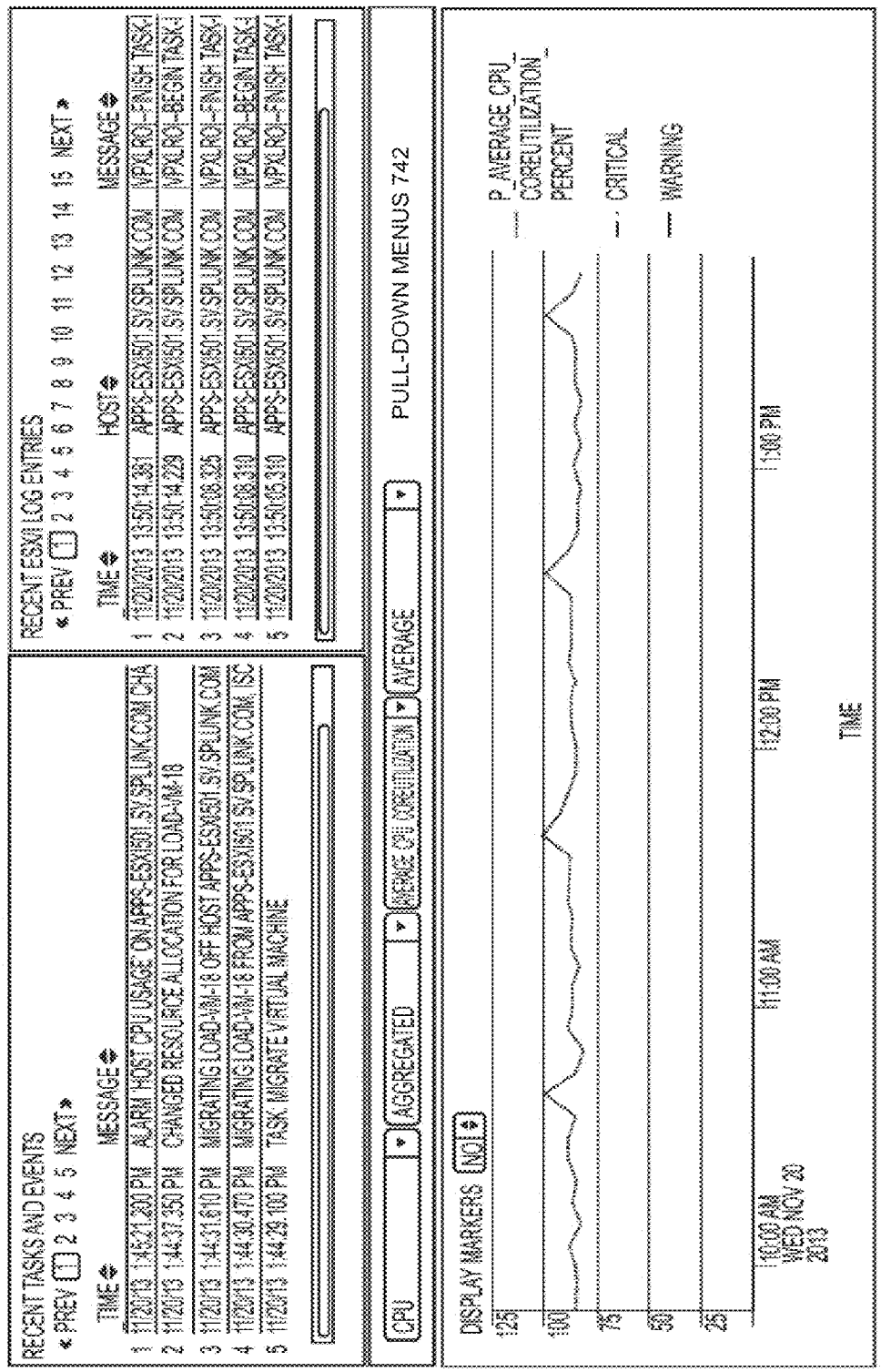
FIG. 14D illustrates a screen displaying both log data and performance data in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 14C, wherein nodes 1433 and 1434 are selectively expanded. Note that nodes 1431-1439 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 14D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Figure 15:
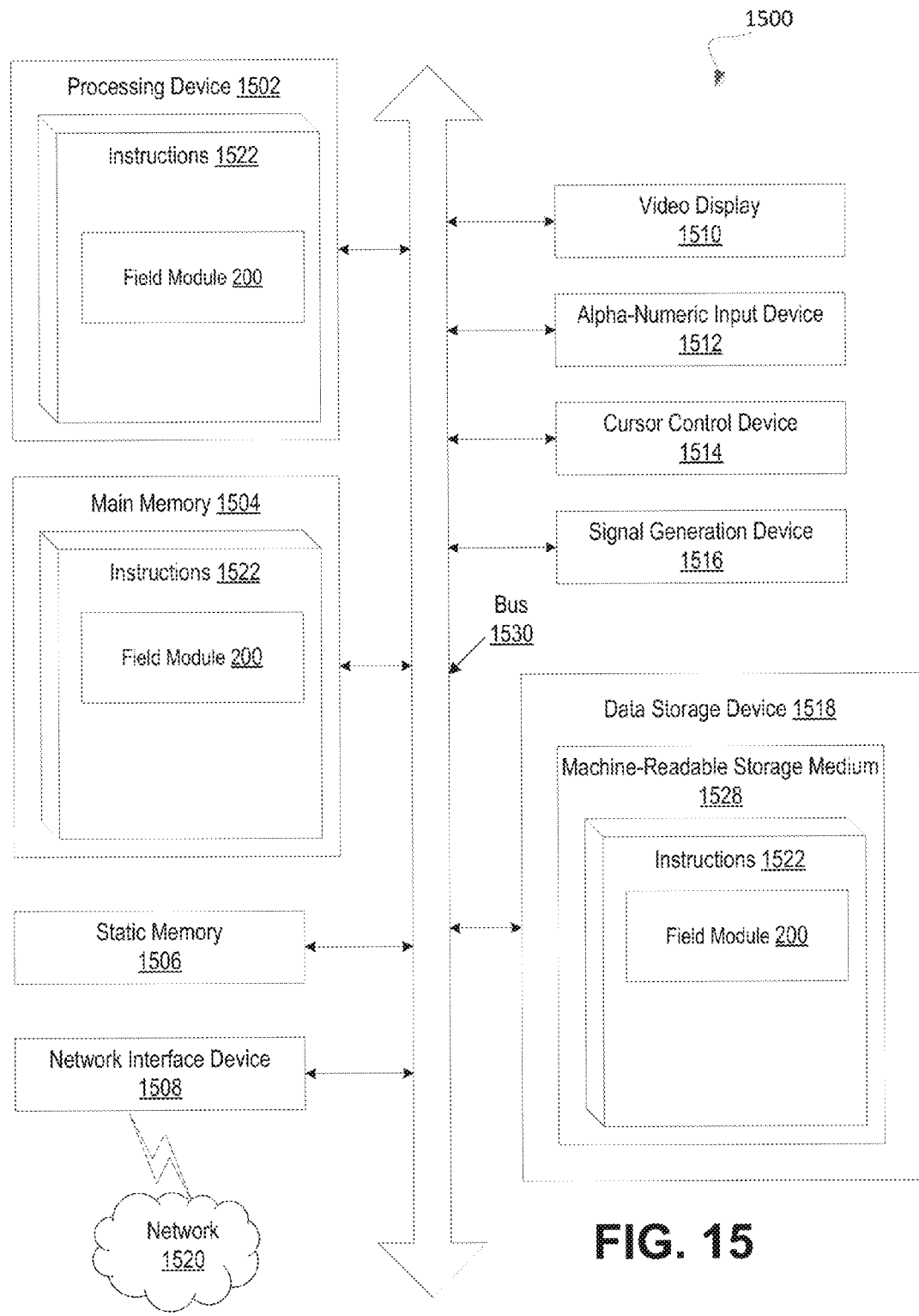
FIG. 15 illustrates a block diagram of an embodiment of a computer system in which some embodiments of the disclosure may operate.

FIG. 15 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet via a network 1520. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device 1502, a main memory 1504 (e.g., read-only memory (ROM), flash memory, dynamic random access memory (DRAM) such as synchronous DRAM (SDRAM) or DRAM (RDRAM), etc.), a static memory 1506 (e.g., flash memory, static random access memory (SRAM), etc.), and a data storage device 1518, which communicate with each other via a bus 1530.

Processing device 1502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 is configured to execute instructions 1526 for performing the operations and steps discussed herein.

The computer system may further include a network interface device 1508. The computer system also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a video processing unit 1528, an audio processing unit 1532, and a signal generation device 1516 (e.g., a speaker).

The data storage device 1518 may include a machine-readable storage medium 1524 (also known as a computer-readable medium) on which is stored one or more sets of instructions or software 1526 embodying any one or more of the methodologies or functions described herein. The instructions 1526 may also reside, completely or at least partially, within the main memory 1504 and/or within the processing device 1502 during execution thereof by the computer system, the main memory 1504 and the processing device 1502 also constituting machine-readable storage media.

In one implementation, the instructions 1526 include instructions to implement functionality corresponding to a field module (e.g., field module 200 of FIG. 2). While the machine-readable storage medium 1524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   accessing events returned in response to an initial search query, the accessed events comprising portions of raw data;
   discovering fields in the accessed events, the fields being defined by extraction rules each comprising a regular expression for extracting values from corresponding portions of raw data;
   causing display of a graphical user interface (GUI) that enables a user to select or enter criteria for a subset of the discovered fields without entering a search query in a search bar;
   receiving through a portion of the GUI that does not include a search bar for entering a search query at least one criterion for at least one field from the subset of the discovered fields;
   causing, by a processing device, the events returned in response to the initial search query to be filtered based on the received at least one criterion for the at least one field;
   determining a number of the returned events that comprise a first field of the discovered fields; and
   calculating a score for the first field based on the number of the returned events that comprise the first field, wherein a first field name associated with the first field is selected to be displayed in the GUI based on the calculated score.

2. The method of claim 1, wherein the raw data included in the events includes machine data.

3. The method of claim 1, wherein the fields are predefined fields.

4. The method of claim 1, wherein the fields are discovered as the events are accessed.

5. The method of claim 1, further comprising:
   causing display of a visualization of data in the filtered events.

6. A method comprising:
   accessing events returned in response to an initial search query, the accessed events comprising portions of raw data;
   discovering fields in the accessed events, the fields being defined by extraction rules each comprising a regular expression for extracting values from corresponding portions of raw data;
   causing display of a graphical user interface (GUI) that enables a user to select or enter criteria for a subset of the discovered fields without entering a search query in a search bar;
   receiving through a portion of the GUI that does not include a search bar for entering a search query at least one criterion for at least one field from the subset of the discovered fields;
   causing, by a processing device, the events returned in response to the initial search query to be filtered based on the received at least one criterion for the at least one field;
   determining a number of unique values of a first field of the discovered fields; and
   calculating a score for the first field based on the number of unique values of the first field, wherein a first field name associated with the first field is selected to be displayed in the GUI based on the calculated score.

7. The method of claim 6, wherein the raw data included in the events includes machine data.

8. The method of claim 6, wherein the fields are predefined fields.

9. The method of claim 6, wherein the fields are discovered as the events are accessed.

10. The method of claim 6, further comprising:
    causing display of a visualization of data in the filtered events.

11. A method comprising:
    accessing events returned in response to an initial search query, the accessed events comprising portions of raw data;
    discovering fields in the accessed events, the fields being defined by extraction rules each comprising a regular expression for extracting values from corresponding portions of raw data;

causing display of a graphical user interface (GUI) that enables a user to select or enter criteria for a subset of the discovered fields without entering a search query in a search bar;

receiving through a portion of the GUI that does not include a search bar for entering a search query at least one criterion for at least one field from the subset of the discovered fields;

causing, by a processing device, the events returned in response to the initial search query to be filtered based on the received at least one criterion for the at least one field;

calculating a score for each of the discovered fields; and receiving a threshold percentage of the discovered fields to display in the GUI, wherein the set of field names associated with at least a portion of the discovered fields are selected to be displayed in the GUI based on the threshold percentage and the calculated score for each of the discovered fields, wherein the threshold percentage indicates a percentage of the discovered fields to be selected to be displayed in the GUI.

12. The method of claim 11, wherein the raw data included in the events includes machine data.

13. The method of claim 11, wherein the fields are pre-defined fields.

14. The method of claim 11, wherein the fields are discovered as the events are accessed.

15. The method of claim 11, further comprising:
causing display of a visualization of data in the filtered events.

16. A method comprising:
accessing events returned in response to an initial search query, the accessed events comprising portions of raw data;

discovering fields in the accessed events, the fields being defined by extraction rules each comprising a regular expression for extracting values from corresponding portions of raw data;

causing display of a graphical user interface (GUI) that enables a user to select or enter criteria for a subset of the discovered fields without entering a search query in a search bar;

receiving through a portion of the GUI that does not include a search bar for entering a search query at least one criterion for at least one field from the subset of the discovered fields;

causing, by a processing device, the events returned in response to the initial search query to be filtered based on the received at least one criterion for the at least one field;

generating a data model based on discovered fields and the initial search query.

17. The method of claim 16, wherein the raw data included in the events includes machine data.

18. The method of claim 16, wherein the fields are pre-defined fields.

19. The method of claim 16, wherein the fields are discovered as the events are accessed.

20. The method of claim 16, further comprising:
causing display of a visualization of data in the filtered events.

21. A method comprising:
accessing events returned in response to an initial search query, the accessed events comprising portions of raw data;

discovering fields in the accessed events, the fields being defined by extraction rules each comprising a regular expression for extracting values from corresponding portions of raw data;

causing display of a graphical user interface (GUI) that enables a user to select or enter criteria for a subset of the discovered fields without entering a search query in a search bar;

receiving through a portion of the GUI that does not include a search bar for entering a search query at least one criterion for at least one field from the subset of the discovered fields;

causing, by a processing device, the events returned in response to the initial search query to be filtered based on the received at least one criterion for the at least one field;

generating a data model based on the discovered fields; and modifying a search defining events to which a data model is applicable based on the one or more discovered fields associated with the selected one or more field names.

22. The method of claim 21, wherein the raw data included in the events includes machine data.

23. The method of claim 21, wherein the fields are pre-defined fields.

24. The method of claim 21, wherein the fields are discovered as the events are accessed.

25. The method of claim 21, further comprising:
causing display of a visualization of data in the filtered events.

26. A method comprising:
accessing events returned in response to an initial search query, the accessed events comprising portions of raw data;

discovering fields in the accessed events, the fields being defined by extraction rules each comprising a regular expression for extracting values from corresponding portions of raw data;

causing display of a graphical user interface (GUI) that enables a user to select or enter criteria for a subset of the discovered fields without entering a search query in a search bar;

receiving through a portion of the GUI that does not include a search bar for entering a search query at least one criterion for at least one field from the subset of the discovered fields;

causing, by a processing device, the events returned in response to the initial search query to be filtered based on the received at least one criterion for the at least one field;

generating a data model based on the initial search query and the discovered fields;

saving the data model; and applying the data model to a different data set than was searched using the initial search query.

27. The method of claim 26, wherein the raw data included in the events includes machine data.

28. The method of claim 26, wherein the fields are pre-defined fields.

29. The method of claim 26, wherein the fields are discovered as the events are accessed.

30. The method of claim 26, further comprising:
causing display of a visualization of data in the filtered events.

31. A system comprising:
a memory; and
a processing device coupled to the memory, to:
- access events returned in response to an initial search query, the accessed events comprising portions of raw data;
- discover fields in the accessed events, the fields being defined by extraction rules each comprising a regular expression for extracting values from corresponding portions of raw data;
- cause display of a graphical user interface (GUI) that enables a user to select or enter criteria for a subset of the discovered fields without entering a search query in a search bar;
- receive through a portion of the GUI that does not include a search bar for entering a search query at least one criterion for at least one field from the subset of the discovered fields;
- cause the events returned in response to the initial search query to be filtered based on the received at least one criterion for the at least one field;
- determine a number of the returned events that comprise a first field of the discovered fields; and
- calculate a score for the first field based on the number of the returned events that comprise the first field, wherein a first field name associated with the first field is selected to be displayed in the GUI based on the calculated score.

32. The system of claim 31, wherein the raw data included in the events includes machine data.

33. A system comprising:
a memory; and
a processing device coupled to the memory, to:
- access events returned in response to an initial search query, the accessed events comprising portions of raw data;
- discover fields in the accessed events, the fields being defined by extraction rules each comprising a regular expression for extracting values from corresponding portions of raw data;
- cause display of a graphical user interface (GUI) that enables a user to select or enter criteria for a subset of the discovered fields without entering a search query in a search bar;
- receive through a portion of the GUI that does not include a search bar for entering a search query at least one criterion for at least one field from the subset of the discovered fields;
- cause the events returned in response to the initial search query to be filtered based on the received at least one criterion for the at least one field;
- determine a number of unique values of a first field of the discovered fields; and
- calculate a score for the first field based on the number of unique values of the first field, wherein a first field name associated with the first field is selected to be displayed in the GUI based on the calculated score.

34. The system of claim 33, wherein the raw data included in the events includes machine data.

35. A system comprising:
a memory; and
a processing device coupled to the memory, to:
- access events returned in response to an initial search query, the accessed events comprising portions of raw data;
- discover fields in the accessed events, the fields being defined by extraction rules each comprising a regular expression for extracting values from corresponding portions of raw data;
- cause display of a graphical user interface (GUI) that enables a user to select or enter criteria for a subset of the discovered fields without entering a search query in a search bar;
- receive through a portion of the GUI that does not include a search bar for entering a search query at least one criterion for at least one field from the subset of the discovered fields;
- cause the events returned in response to the initial search query to be filtered based on the received at least one criterion for the at least one field;
- generate a data model based on discovered fields and the initial search query.

36. The system of claim 35, wherein the raw data included in the events includes machine data.

37. One or more non-transitory computer readable storage media storing instructions which, when executed by one or more computing devices, cause:
- accessing events returned in response to an initial search query, the accessed events comprising portions of raw data;
- discovering fields in the accessed events, the fields being defined by extraction rules each comprising a regular expression for extracting values from corresponding portions of raw data;
- causing display of a graphical user interface (GUI) that enables a user to select or enter criteria for a subset of the discovered fields without entering a search query in a search bar;
- receiving through a portion of the GUI that does not include a search bar for entering a search query at least one criterion for at least one field from the subset of the discovered fields;
- causing, by a processing device, the events returned in response to the initial search query to be filtered based on the received at least one criterion for the at least one field;
- determining a number of the returned events that comprise a first field of the discovered fields; and
- calculating a score for the first field based on the number of the returned events that comprise the first field, wherein a first field name associated with the first field is selected to be displayed in the GUI based on the calculated score.

38. The one or more non-transitory storage media of claim 37, wherein the raw data included in the events includes machine data.

39. One or more non-transitory computer readable storage media storing instructions which, when executed by one or more computing devices, cause:
- accessing events returned in response to an initial search query, the accessed events comprising portions of raw data;
- discovering fields in the accessed events, the fields being defined by extraction rules each comprising a regular expression for extracting values from corresponding portions of raw data;
- causing display of a graphical user interface (GUI) that enables a user to select or enter criteria for a subset of the discovered fields without entering a search query in a search bar;

receiving through a portion of the GUI that does not include a search bar for entering a search query at least one criterion for at least one field from the subset of the discovered fields;

causing, by a processing device, the events returned in response to the initial search query to be filtered based on the received at least one criterion for the at least one field; and generating a data model based on discovered fields and the initial search query.

40. The one or more non-transitory storage media of claim 39, wherein the raw data included in the events includes machine data.

* * * * *